United States Patent
Taylor et al.

(10) Patent No.: US 9,679,227 B2
(45) Date of Patent: Jun. 13, 2017

(54) SYSTEM AND METHOD FOR DETECTING FEATURES IN AERIAL IMAGES USING DISPARITY MAPPING AND SEGMENTATION TECHNIQUES

(71) Applicant: Xactware Solutions, Inc., Orem, UT (US)

(72) Inventors: Jeffrey Taylor, Highland, UT (US); Edmund Webecke, Highland, UT (US)

(73) Assignee: Xactware Solutions, Inc., Lehi, UT (US)

( * ) Notice: Subject to any disclaimer, the term of this patent is extended or adjusted under 35 U.S.C. 154(b) by 0 days.

(21) Appl. No.: 14/450,861

(22) Filed: Aug. 4, 2014

(65) Prior Publication Data
US 2015/0347872 A1 Dec. 3, 2015

Related U.S. Application Data

(60) Provisional application No. 61/861,610, filed on Aug. 2, 2013.

(51) Int. Cl.
 *G06K 9/00* (2006.01)
 *G06K 9/62* (2006.01)
 (Continued)

(52) U.S. Cl.
 CPC ............ *G06K 9/6292* (2013.01); *G01C 11/06* (2013.01); *G06K 9/00637* (2013.01);
 (Continued)

(58) Field of Classification Search
 CPC .............. G06K 9/6292; G06K 9/00637; G06T 7/0081; G06T 7/0075; G06T 2207/20148;
 (Continued)

(56) References Cited

U.S. PATENT DOCUMENTS

| 3,908,281 A | 9/1975 | Fox |
| 4,845,643 A | 7/1989 | Clapp |

(Continued)

FOREIGN PATENT DOCUMENTS

| AU | 2008/230031 B8 | 7/2010 |
| CA | 2191954 A1 | 12/1995 |

(Continued)

OTHER PUBLICATIONS

Bailiard, et al., "3-D Reconstruction of Urban Scenes from Aerial Stereo Imagery: A Focusing Strategy," Computer Vision and Image Understanding, vol. 76, No. 3 pp. 244-258, Dec. 1999 (15 pages).*

(Continued)

*Primary Examiner* — Sheela C Chawan
(74) *Attorney, Agent, or Firm* — McCarter & English, LLP

(57) ABSTRACT

A system for aerial image detection and classification is provided herein. The system comprising an aerial image database storing one or more aerial images electronically received from one or more image providers, and an object detection pre-processing engine in electronic communication with the aerial image database, the object detection pre-processing engine detecting and classifying objects using a disparity mapping generation sub-process to automatically process the one or more aerial images to generate a disparity map providing elevation information, a segmentation sub-process to automatically apply a pre-defined elevation threshold to the disparity map, the pre-defined elevation threshold adjustable by a user, and a classification sub-process to automatically detect and classify objects in the one or more stereoscopic pairs of aerial images by applying one or more automated detectors based on classification parameters and the pre-defined elevation threshold.

21 Claims, 28 Drawing Sheets

(51) Int. Cl.
*H04N 13/00* (2006.01)
*G06T 7/00* (2017.01)
*G01C 11/06* (2006.01)
*G06K 9/32* (2006.01)

(52) U.S. Cl.
CPC .......... *G06K 9/3233* (2013.01); *G06T 7/0075* (2013.01); *G06T 7/0081* (2013.01); *H04N 13/0022* (2013.01); *G06K 9/00201* (2013.01); *G06T 2207/10021* (2013.01); *G06T 2207/10028* (2013.01); *G06T 2207/10032* (2013.01); *G06T 2207/20141* (2013.01); *G06T 2207/20148* (2013.01); *G06T 2207/30184* (2013.01); *H04N 2013/0081* (2013.01); *H04N 2013/0092* (2013.01)

(58) Field of Classification Search
CPC . G06T 2207/20141; G06T 2207/10028; G06T 2207/30184; G06T 2207/10032; H04N 13/0022; H04N 2013/0092; H04N 2013/0081
USPC ....... 382/100, 113, 224, 190, 103, 155, 294, 382/278, 181, 173, 154
See application file for complete search history.

(56) References Cited

U.S. PATENT DOCUMENTS

| | | |
|---|---|---|
| 5,247,356 A | 9/1993 | Ciampa |
| 5,259,037 A | 11/1993 | Plunk |
| 5,422,989 A | 6/1995 | Bell et al. |
| 5,633,995 A | 5/1997 | McClain |
| 5,666,441 A | 9/1997 | Rao et al. |
| 5,727,138 A | 3/1998 | Harada |
| 5,983,010 A | 11/1999 | Murdock et al. |
| 6,037,945 A | 3/2000 | Loveland |
| 6,046,745 A | 4/2000 | Moriya et al. |
| 6,134,338 A | 10/2000 | Solberg et al. |
| 6,198,431 B1 | 3/2001 | Gibson |
| 6,323,885 B1 | 11/2001 | Wiese |
| 6,333,749 B1 | 12/2001 | Reinhardt et al. |
| 6,342,884 B1 | 1/2002 | Kamen et al. |
| 6,356,280 B1 | 3/2002 | Kamen et al. |
| 6,385,541 B1 | 5/2002 | Blumberg et al. |
| 6,396,491 B2 | 5/2002 | Watanabe et al. |
| 6,434,277 B1 | 8/2002 | Yamada et al. |
| 6,446,053 B1 | 9/2002 | Elliott |
| 6,448,964 B1 | 9/2002 | Isaacs et al. |
| 6,456,287 B1 | 9/2002 | Kamen et al. |
| 6,496,184 B1 | 12/2002 | Freeman et al. |
| 6,525,728 B2 | 2/2003 | Kamen et al. |
| 6,556,195 B1 | 4/2003 | Totsuka et al. |
| 6,581,045 B1 | 6/2003 | Watson |
| 6,636,803 B1 | 10/2003 | Hartz, Jr. et al. |
| 6,810,383 B1 | 10/2004 | Loveland |
| 6,816,819 B1 | 11/2004 | Loveland |
| 6,826,539 B2 | 11/2004 | Loveland |
| 6,829,584 B2 | 12/2004 | Loveland |
| 6,836,270 B2 | 12/2004 | Du |
| 6,912,293 B1 | 6/2005 | Korobkin |
| 6,980,690 B1 | 12/2005 | Taylor et al. |
| 6,982,712 B2 | 1/2006 | Ohto |
| 7,003,400 B2 | 2/2006 | Bryant |
| 7,006,977 B1 | 2/2006 | Attra et al. |
| 7,098,909 B2 | 8/2006 | Hayano et al. |
| 7,133,551 B2 | 11/2006 | Chen et al. |
| 7,149,346 B2 | 12/2006 | Oniyama |
| 7,164,883 B2 | 1/2007 | Rappaport et al. |
| 7,187,452 B2 | 3/2007 | Jupp et al. |
| 7,246,044 B2 | 7/2007 | Imamura et al. |
| 7,305,983 B1 | 12/2007 | Meder et al. |
| 7,324,666 B2 | 1/2008 | Zoken et al. |
| 7,343,268 B2 | 3/2008 | Kishikawa |
| 7,376,284 B2 | 5/2008 | Tao et al. |
| 7,386,164 B2 * | 6/2008 | Shragai ............... G06K 9/0063 382/154 |
| 7,421,125 B1 * | 9/2008 | Rees ..................... G06K 9/34 382/181 |
| 7,424,133 B2 | 9/2008 | Schultz et al. |
| 7,444,013 B2 | 10/2008 | Chen |
| 7,487,114 B2 | 2/2009 | Florance et al. |
| 7,508,977 B2 | 3/2009 | Lyons et al. |
| 7,509,241 B2 | 3/2009 | Guo et al. |
| 7,515,153 B2 | 4/2009 | Jin et al. |
| 7,519,206 B2 | 4/2009 | Mulet-Parada et al. |
| 7,720,276 B1 | 5/2010 | Korobkin |
| 7,728,833 B2 | 6/2010 | Verma et al. |
| 7,752,018 B2 | 7/2010 | Rahmes et al. |
| 7,787,659 B2 | 8/2010 | Schultz et al. |
| 7,804,996 B2 | 9/2010 | Ohtomo et al. |
| 7,869,981 B2 | 1/2011 | Pendyala et al. |
| 7,873,238 B2 | 1/2011 | Schultz et al. |
| 7,920,963 B2 | 4/2011 | Jouline et al. |
| 7,961,982 B2 * | 6/2011 | Sibiryakov .......... G06K 9/6211 382/107 |
| 7,991,226 B2 | 8/2011 | Schultz et al. |
| 7,995,799 B2 | 8/2011 | Schultz et al. |
| 7,995,862 B2 | 8/2011 | Tao et al. |
| 8,040,343 B2 | 10/2011 | Kikuchi et al. |
| 8,059,888 B2 | 11/2011 | Chen et al. |
| 8,068,643 B2 | 11/2011 | Schultz et al. |
| 8,078,396 B2 | 12/2011 | Meadow et al. |
| 8,078,436 B2 | 12/2011 | Pershing et al. |
| 8,081,841 B2 | 12/2011 | Schultz et al. |
| 8,099,264 B2 | 1/2012 | Kelley et al. |
| 8,131,514 B2 | 3/2012 | Royan et al. |
| 8,145,578 B2 | 3/2012 | Pershing et al. |
| 8,154,633 B2 | 4/2012 | Gloudemans et al. |
| 8,170,840 B2 | 5/2012 | Pershing |
| 8,204,341 B2 | 6/2012 | Schultz et al. |
| 8,207,964 B1 | 6/2012 | Meadow et al. |
| 8,209,152 B2 | 6/2012 | Pershing |
| 8,233,666 B2 | 7/2012 | Schultz et al. |
| 8,331,654 B2 * | 12/2012 | Abraham .............. G06T 7/0075 382/154 |
| 8,385,672 B2 | 2/2013 | Giuffrida et al. |
| 8,401,222 B2 | 3/2013 | Thornberry et al. |
| 8,452,125 B2 | 5/2013 | Schultz et al. |
| 8,477,190 B2 | 7/2013 | Giuffrida et al. |
| 8,515,125 B2 | 8/2013 | Thornberry et al. |
| 8,515,198 B2 | 8/2013 | Giuffrida et al. |
| 8,520,079 B2 | 8/2013 | Schultz et al. |
| 8,531,472 B2 | 9/2013 | Freund et al. |
| 8,542,880 B2 | 9/2013 | Thornberry et al. |
| 8,588,547 B2 | 11/2013 | Giuffrida et al. |
| 8,593,518 B2 | 11/2013 | Schultz et al. |
| 8,630,510 B2 | 1/2014 | Giuffrida et al. |
| 8,634,594 B2 | 1/2014 | Schultz et al. |
| 8,634,597 B2 | 1/2014 | Ivanov et al. |
| 8,643,720 B2 | 2/2014 | Schultz et al. |
| 8,648,872 B2 | 2/2014 | Freund et al. |
| 8,649,596 B2 | 2/2014 | Schultz et al. |
| 8,660,382 B2 | 2/2014 | Schultz et al. |
| 8,670,961 B2 * | 3/2014 | Pershing ............... G06Q 30/02 703/1 |
| 8,731,234 B1 | 5/2014 | Ciarcia et al. |
| 8,774,525 B2 | 7/2014 | Pershing |
| 8,818,076 B2 | 8/2014 | Shenkar et al. |
| 8,818,770 B2 | 8/2014 | Pershing |
| 8,823,732 B2 | 9/2014 | Adams et al. |
| 8,825,454 B2 | 9/2014 | Pershing |
| 8,855,442 B2 * | 10/2014 | Owechko ..................... 345/419 |
| 8,938,090 B2 | 1/2015 | Thornberry et al. |
| 8,970,615 B2 | 3/2015 | Freund et al. |
| 8,971,624 B2 | 3/2015 | Schultz et al. |
| 8,977,520 B2 | 3/2015 | Stephens et al. |
| 8,995,757 B1 | 3/2015 | Ciarcia et al. |
| 9,014,415 B2 * | 4/2015 | Chen ..................... G06T 7/0002 382/100 |
| 9,036,861 B2 * | 5/2015 | Chen ..................... G06T 7/0002 382/100 |
| 9,047,688 B2 * | 6/2015 | Lynch ................ G01C 21/3638 |
| 9,070,018 B1 | 6/2015 | Ciarcia et al. |

(56) References Cited

U.S. PATENT DOCUMENTS

| | | |
|---|---|---|
| 9,129,376 B2 | 9/2015 | Pershing |
| 9,135,737 B2 | 9/2015 | Pershing |
| 9,141,880 B2 | 9/2015 | Ciarcia |
| 9,147,276 B2 | 9/2015 | Giuffrida et al. |
| 9,147,287 B2 | 9/2015 | Ciarcia |
| 9,159,164 B2 | 10/2015 | Ciarcia |
| 9,182,657 B2 | 11/2015 | Schultz et al. |
| 9,183,538 B2 | 11/2015 | Thornberry et al. |
| 2002/0061132 A1 | 5/2002 | Furukawa |
| 2002/0076098 A1 | 6/2002 | Love |
| 2002/0154174 A1 | 10/2002 | Redlich et al. |
| 2002/0167515 A1 | 11/2002 | Kamen et al. |
| 2003/0014224 A1 | 1/2003 | Guo et al. |
| 2003/0023412 A1 | 1/2003 | Rappaport et al. |
| 2003/0028393 A1 | 2/2003 | Coulston et al. |
| 2003/0088362 A1 | 5/2003 | Melero et al. |
| 2003/0115163 A1 | 6/2003 | Moore et al. |
| 2003/0147553 A1 | 8/2003 | Chen et al. |
| 2003/0171957 A1 | 9/2003 | Watrous |
| 2003/0233310 A1 | 12/2003 | Stavrovski |
| 2004/0047498 A1 | 3/2004 | Mulet-Parada et al. |
| 2004/0105573 A1 | 6/2004 | Neumann et al. |
| 2004/0220906 A1 | 11/2004 | Gargi et al. |
| 2004/0263514 A1 | 12/2004 | Jin et al. |
| 2004/0264763 A1 | 12/2004 | Mas et al. |
| 2005/0012742 A1 | 1/2005 | Royan |
| 2005/0203768 A1 | 9/2005 | Florance et al. |
| 2005/0288959 A1 | 12/2005 | Eraker et al. |
| 2006/0056732 A1 | 3/2006 | Holmes |
| 2006/0061566 A1 | 3/2006 | Verma et al. |
| 2006/0136126 A1 | 6/2006 | Coombes et al. |
| 2006/0137736 A1 | 6/2006 | Nishitani et al. |
| 2006/0188143 A1 | 8/2006 | Strassenburg-Kleciak |
| 2006/0200311 A1 | 9/2006 | Arutunian et al. |
| 2006/0232605 A1 | 10/2006 | Imamura |
| 2006/0239537 A1 | 10/2006 | Shragai et al. |
| 2006/0262112 A1 | 11/2006 | Shimada |
| 2006/0265287 A1 | 11/2006 | Kubo |
| 2007/0036467 A1 | 2/2007 | Coleman et al. |
| 2007/0115284 A1 | 5/2007 | Kim et al. |
| 2007/0150366 A1 | 6/2007 | Yahiro et al. |
| 2007/0220174 A1 | 9/2007 | Abhyanker |
| 2008/0021683 A1 | 1/2008 | Rahmes et al. |
| 2008/0068379 A1 | 3/2008 | Larsen et al. |
| 2008/0071604 A1 | 3/2008 | Scanlan |
| 2008/0089610 A1 | 4/2008 | Tao et al. |
| 2008/0103991 A1 | 5/2008 | Moore et al. |
| 2008/0105045 A1 | 5/2008 | Woro |
| 2008/0162380 A1 | 7/2008 | Suga et al. |
| 2008/0204570 A1 | 8/2008 | Schultz et al. |
| 2008/0221843 A1 | 9/2008 | Shenkar et al. |
| 2008/0231700 A1 | 9/2008 | Schultz et al. |
| 2008/0262789 A1 | 10/2008 | Pershing et al. |
| 2008/0279447 A1 | 11/2008 | Friedlander et al. |
| 2008/0310756 A1 | 12/2008 | Tao et al. |
| 2009/0089018 A1 | 4/2009 | Kelley et al. |
| 2009/0110327 A1 | 4/2009 | Chen et al. |
| 2009/0132210 A1 | 5/2009 | Royan et al. |
| 2009/0132436 A1 | 5/2009 | Pershing et al. |
| 2009/0141020 A1 | 6/2009 | Freund et al. |
| 2009/0216501 A1 | 8/2009 | Yeow et al. |
| 2009/0234692 A1 | 9/2009 | Powell et al. |
| 2009/0271154 A1 | 10/2009 | Coad et al. |
| 2009/0304227 A1 | 12/2009 | Kennedy et al. |
| 2009/0310867 A1 | 12/2009 | Matei et al. |
| 2010/0034483 A1 | 2/2010 | Giuffrida et al. |
| 2010/0060631 A1 | 3/2010 | Sugihara |
| 2010/0110074 A1 | 5/2010 | Pershing |
| 2010/0114537 A1 | 5/2010 | Pershing |
| 2010/0164953 A1 | 7/2010 | Wouhaybi et al. |
| 2010/0179787 A2 | 7/2010 | Pershing et al. |
| 2010/0182316 A1 | 7/2010 | Akbari et al. |
| 2010/0201682 A1 | 8/2010 | Quan et al. |
| 2010/0217724 A1 | 8/2010 | Wayne et al. |
| 2010/0275018 A1 | 10/2010 | Pedersen |
| 2010/0296693 A1 | 11/2010 | Thornberry et al. |
| 2010/0303340 A1 | 12/2010 | Abraham et al. |
| 2011/0096083 A1 | 4/2011 | Schultz |
| 2011/0157213 A1 | 6/2011 | Takeyama et al. |
| 2011/0164029 A1 | 7/2011 | King et al. |
| 2011/0187713 A1 | 8/2011 | Pershing et al. |
| 2011/0205245 A1 | 8/2011 | Kennedy et al. |
| 2011/0222757 A1* | 9/2011 | Yeatman, Jr. ...... H04N 13/0239 382/154 |
| 2012/0026322 A1 | 2/2012 | Malka et al. |
| 2012/0101783 A1 | 4/2012 | Stephens et al. |
| 2012/0154446 A1 | 6/2012 | Adams et al. |
| 2012/0170797 A1 | 7/2012 | Pershing et al. |
| 2012/0183217 A1 | 7/2012 | Schultz et al. |
| 2012/0191424 A1 | 7/2012 | Pershing |
| 2012/0209782 A1 | 8/2012 | Pershing et al. |
| 2012/0223965 A1 | 9/2012 | Pershing |
| 2012/0253725 A1 | 10/2012 | Malka et al. |
| 2012/0253751 A1 | 10/2012 | Malka et al. |
| 2012/0288158 A1 | 11/2012 | Schultz et al. |
| 2013/0113831 A1 | 5/2013 | Giuffrida et al. |
| 2013/0135471 A1 | 5/2013 | Giuffrida et al. |
| 2013/0138401 A1 | 5/2013 | Thornberry et al. |
| 2013/0170694 A1 | 7/2013 | Thornberry et al. |
| 2013/0202157 A1 | 8/2013 | Pershing |
| 2013/0204575 A1 | 8/2013 | Pershing |
| 2013/0208116 A1 | 8/2013 | Schultz et al. |
| 2013/0208996 A1 | 8/2013 | Schultz et al. |
| 2013/0211790 A1* | 8/2013 | Loveland ............ G06K 9/00637 703/1 |
| 2013/0212536 A1 | 8/2013 | Thornberry et al. |
| 2013/0226515 A1 | 8/2013 | Pershing et al. |
| 2014/0064554 A1* | 3/2014 | Coulter ................ G06K 9/3216 382/103 |
| 2015/0370929 A1 | 12/2015 | Pershing |

FOREIGN PATENT DOCUMENTS

| | | |
|---|---|---|
| DE | 1419359 A1 | 12/1995 |
| DE | 19719620 A1 | 11/1998 |
| DE | 19857667 A1 | 8/2000 |
| EP | 1010966 A1 | 6/2000 |
| WO | 00/29806 A2 | 5/2000 |
| WO | 2004/044692 A2 | 5/2004 |
| WO | 2005/124276 A2 | 12/2005 |
| WO | 2006/040775 A2 | 4/2006 |
| WO | 2006/090132 A2 | 8/2006 |
| WO | 2009/049151 A1 | 4/2009 |
| WO | 2009/073726 A1 | 6/2009 |
| WO | 2010/017255 A2 | 2/2010 |
| WO | 2011/056402 A2 | 5/2011 |
| WO | 2011/094760 A2 | 8/2011 |
| WO | 2012/050648 A2 | 4/2012 |
| WO | 2012/054239 A2 | 4/2012 |
| WO | 2012/083135 A1 | 6/2012 |
| WO | 2013/116164 A1 | 8/2013 |
| WO | 2013/116165 A1 | 8/2013 |
| WO | 2013/116793 A2 | 8/2013 |
| WO | 2013/116794 A2 | 8/2013 |
| WO | 2014/149509 A2 | 9/2014 |
| WO | 2014/151122 A1 | 9/2014 |
| WO | 2015/081026 A1 | 6/2015 |

OTHER PUBLICATIONS

Preciozzi, Dense Urban Elevation Models From Stereo Images by an Affine Region Merging Approach, Master's Thes s, Un versidad de la Republica, Montevideo, Sep. 18, 2006 (93 pages) II.*

International Search Report of the International Searching Authority mailed on Nov. 17, 2014, issued in connection with International Application No. PCT/US14/49605 (2 pages).

Written Opinion of the International Searching Authority mailed on Nov. 17, 2014, issued in connection with International Application No. PCT/US14/49605 (4 pages).

Baillard, et al., "3-D Reconstruction of Urban Scenes from Aerial Stereo Imagery: A Focusing Strategy," Computer Vision and Image Understanding, vol. 76, No. 3 pp. 244-258, Dec. 1999 (15 pages).

(56) References Cited

OTHER PUBLICATIONS

Preciozzi, "Dense Urban Elevation Models From Stereo Images by an Affine Region Merging Approach," Master's Thesis, Universidad de la Republica, Montevideo, Sep. 18, 2006 (93 pages).
Lu, et al., "Stereo Image Matching Using Robust Estimation and Image Analysis Techniques for Dem Generation," Interntaional Archives of Photogrammetry and Remote Sensing, vol. XXXIII, Part B3, Amsterdam 2000 (8 pages).
Syed, et al., "Semi-Automatic 3D Building Model Generation From Lidar and High Resolutioin Imagery," Proceedings of SSC Spatial Intelligence, Sep. 2005 (8 pages).
A History of Roof Modelling Using Aerial Imagery, Sep. 1983.
Able Software Corp., "R2V User's Manual, Advanced Raster to Vector Conversion Software". Publicly available Sep. 16, 2000.
AeroDach Web Site http://www.aerodach.de from Jun. 13, 2004 (retrieved Sep. 20, 2012) and translations to English.
Aerodach, "Protokoll zur Dachauswertung", Oct. 19, 2010.
Aerowest GmbH Logo, "Aerodach Online Roof Analysis: Standard Delivery Format and 3D Dataset", 2002.
Aerowest GmbH, "AeroDach-das patentierte Dachaufmass", retrieved from URL=http://web.archive.org/web/20060101021543/http://www.aerowest.de/aerodach.html, 2006.
Aerowest GmbH, "Aerowest Pricelist of Geodata", AeroDach Online, Aeroview, Oct. 21, 2005.
Aerowest GmbH, "Geodata Service; AeroDach-Patented Roof Dimensions", 2006.
Aerowest GmbH, "Preisliste Geodaten Aerowest", Oct. 21, 2005.
Aerowest GmbH, AeroDach Online Dachauswertung: Standardlieferformat and 3D-Datensatz, 2002.
Aerowest GmbH, AeroDach Online, Geodatenservice, 2005.
Aerowest Web Site http://aerowest.de/ from Feb. 6, 2006 (retrieved Sep. 20, 2012) and translated to English.
Agarwal, et al., "Building Rome in a Day", Communications of the ACM, vol. 54, No. 10, Oct. 2011.
Agarwal, et al., "Reconstructing Rome", IEEE Computer Society, 2010.
Agarwala, et al., "Interactive Digital Photomontage", SIGGRAPH 2004.
Agarwala, et al., "Panoramic Video Textures", ACM SIGGRAPH 2005.
Ameri et al., "Automatic 3D Building Reconstruction Using Plane-Roof Structures", Institute for Photogrammetry, University of Stuttgart, 2000.
American Congress on Surveying and Mapping, "Definitions and Surveying and Associated Terms", 1989.
American Society of Civil Engineering, "Glossary of the Mapping Sciences" ASCE Publications, 1994.
Appli-cad Australia, "Linear Nesting Reports," AppliCad Australia, UK Sample Reports, Jul. 18, 2000.
Appli-cad Australia, "Roof Magician: Especially suited to single, shake and tile roofing," Sample Reports, Jun. 24, 2004.
Appli-cad Australia, "Roof Wizard: Advanced Software for Roof Modeling and Estimating," Sep. 25, 2004.
Appli-cad Australia, "Roof Wizard: Especially suited to metal roofing", Mar. 9, 2005.
Appli-cad Australia, "Roof Wizard: Especially suited to metal roofing," Jul. 13, 2004.
Appli-cad Australia, "Roof Wizard: Especially suited to metal roofing," Sep. 14, 2006.
Appli-cad Australia, "Roof Wizard: Especially suited to metal roofing," Sep. 17, 2002.
Appli-cad Australia, "Sorcerer: Advanced Software for Roof Modeling and Estimating," Reference Guide V. 3, Sep. 8, 1999.
Appli-cad Australia, "Sorcerer: The complete Solution for professional roof estimating," Demonstration Kit, Mar. 9, 2005.
Applicad Roofing, sample report, Jul. 30, 2007.
Applicad Roofing, sample report, Mar. 2, 2005.
AppliCad USA, "Linear Nesting Reports," AppliCad Sample Reports, Nov. 25, 1999.
Applicad webpage 2005 snip different color lines.
Applicad, "Example Output and Brochures," retrieved from URL=http://www.applicad.com/auiproduct-reports.html, Apr. 16, 2012.
Applicad, "Product Bulletin—Nov. 2002: Key Features of Our Roofing Software," Nov. 2002.
AppliCad, "Product Overview—Sorcerer: Advanced Software for Roofing Modeling, Estimating, Presentation and Installation," Issue 5, Mar. 2, 2002.
AppliCad, "Roofing Software: Product Bulletin Section 1—Modeling the Roof," Dec. 20, 2005.
AppliCad, "Roofing Software: Product Bulletin Section 1—Modeling the Roof," Jan. 7, 2002.
AppliCad, "Roofing Software: Product Bulletin Section 2—Modifying the Model," Dec. 20, 2005.
AppliCad, "RoofScape: Advanced Software for Roof Modelling and Estimating," Learning Guide (English Units) Revision 1.1, Aug. 23, 2007.
AppliCad, "Tips and Tricks: Items drawn from AppliCad's Customer Service file", Jul. 27, 2007.
Autodesk, "Autodesk ImageModeler-Features", http://usa.autodesk.com/adsk/servlet/index?siteID=123112&id=115639. . . , 2008.
Automatic House Reconstruction, retrieved on Sep. 29, 2008, from http://www.vision.ee.cthz.ch/projects/Amobe_I/recons.html.
Avrahami, et al., "Extraction of 3D Spatial Polygons Based on the Overlapping Criterion for Roof Extraction from Aerial Images", International Archives of Photogrammetry, Remote Sensing & Spatial Information Sciences, Aug. 29-30, 2005.
Azuma, et al., "View-dependent Refinement of Multiresolution Meshes with Subdivision Connectivity", Feb. 2003.
"8 Epipolar Geometry and the Fundamental Matrix", retrieved Oct. 25, 2013.
Baillard, et al., "Automatic reconstruction of piecewise planar models from multiple views",1999.
Bazaraa, et al., "Nonlinear Programming Theory and Algorithms", Second Edition, John Wiley & Sons, Inc., New York, 1993.
Behley, et al., "Generation of 3D City Models using Domain-Specific Information Fusion", Institute of Computer Science III, 2009.
Bernhardsen, "Geographic Information Systems, An Introduction," 2nd Ed., 1999.
Bertan, et al., "Automatic 3D Roof Reconstruction Using Digital Cadastral Map, Architectural Knowledge and an Aerial Image," 2006.
Bhat, et al., "A Perceptually-Motivated Optimization-Framework for Image and Video Processing", 2008.
Bhat, et al., "Fourier Analysis of the 2D Screened Poisson Equation for Gradient Domain Problems", ECCV 2008.
Bhat, et al., "GradientShop: A Gradient-Domain Optimization Framework for Image and Video Filtering", 2010.
Bhat, et al., "Piecewise Image Registration in the Presence of Multiple Large Motions", Jun. 2006.
Bhat, et al., "Using Photographs to Enhance Videos of a Static Scene", Eurographics Symposium on Rendering, 2007.
Bignone, et al., "Automatic Extraction of Generic House Roofs from High Resolution Aerial Imagery", 1996.
Brofferio, et al., "Interactive Detection of 3D Models of Building's Roofing for the Estimation of the Solar Energy Potential," Sep. 4-8, 2006.
Burrough, et al., "Principles of Geographical Information Systems", Spatial Information Systems and Geostatistics, 1998.
Capell, et al., "A Multiresolution Framework for Dynamic Deformations", SIGGRAPH 2002.
Chen, et al., "Building Reconstruction from LIDAR Data and Aerial Imagery", IEEE 2005.
Chen, et al., "Fusion of LIDAR Data and Optical Imagery for Building Modeling", 2004.
Chen, et al., "Reconstruction of Building Models with Curvilinear Boundaries from Laser Scanner and Aerial Imagery", 2006.
Chevrier, et al., "Interactive 3D Reconstruction for Urban Areas: An image based tool", 2001.

(56) References Cited

OTHER PUBLICATIONS

Chikomo, et al., "An Integrated Approach to Level-of-Detail Building Extraction and Modelling Using Airborne LIDAR and Optical Imagery", Sep. 19-21, 2007.
Chuang, et al., "A Bayesian Approach to Digital Matting", IEEE 2001.
Chuang, et al., "Animating Pictures with Stochastic Motion Textures", SIGGRAPH, 2005.
Chuang, et al., "Animating Pictures with Stochastic Motion Textures", Technical Report UW-CSE-04-04-02, 2005.
Chuang, et al., "Environment Matting Extensions: Towards Higher Accuracy and Real-Time Capture", SIGGRAPH 2000.
Chuang, et al., "Shadow Matting and Compositing", SIGGRAPH 2003.
Clarke, "Getting Started with Geographic Information Systems," Geographic Information Science, 2nd Ed., 1999.
Colbum, et al., "Image-Based Remodeling", IEEE Transactions on Visualization and Computer Graphics, vol. 19, No. 1, 2012.
Collins, et al., "Automatic Extraction of Buildings and Terrain from Aerial Images", Department of Computer Science, University of Massachusetts, 1995.
Collins, et al., "UMass Progress in 3D Building Model Acquisition", 1996.
Notice of Allowance mailed May 20, 2016, issued in connection with U.S. Appl. No. 13/397,325.
Notice of Allowance mailed Sep. 20, 2016, issued in connection with U.S. Appl. No. 13/397,325.
Cord, et al., "Bayesian Model Identification: Application to Building Reconstruction in Aerial Imagery", IEEE 1999.
Croitoru, et al., "Right-Angle Reooftop Polygon Extraction in Regularised Urban Areas: Cutting the Corners," Technion-Israel Institute of Technology, Dec. 2004.
Curless, "From Range Scans to 3D Models" SIGGRAPH Computer Graphics, 1999.
Curless, "New Methods for Surface Reconstruction from Range Images", Dissertation, submitted to the Department of Electrical Engineering and the Committee of Graduate Studies of Stanford University, Jun. 1997.
Curless, et al., "A Volumetric Method for Building Complex Models from Range Images", 1996.
Curless, et al., "Better Optical Triangulation through Spacetime Analysis", 1995.
Curless, et al., "Computer model and 3D fax of Happy Buddha", retrieved Oct. 25, 2013.
Debevec, et al., "Modeling and Rendering Architecture from Photographs: A hybrid geometry- and image-based approach," University of California at Berkeley, 1996.
Delaney, "Searching for Clients from Above—More Small Businesspeople Use Aerial mapping Services to Scout Potential Customers", The Wall Street Journal, Jul. 31, 2007.
Directions Magazine, "Microsoft MSN Virtual Earth: The map is the Search Platform", 2009.
*Eagle View Tech v. Aerialogics LLC*, "Prior Art Presentation", Case No. 2:12-cv-00618-RAJ, Aug. 17, 2012.
Eagle View Technologies and Applicad Software, "AppliCad Software and EagleView Technologies Partner for Metal Roofing Contractors", EagleView Blog, Feb. 4, 2011.
ECE 390 Introduction to Optimization, Spring 2004, retrieved Oct. 25, 2013.
Elaksher, et al., "Roof Boundary Extraction Using Multiple Images", Photogrammetric Record, Mar. 2003.
Elbernick, et al., "Adding the Third Dimension to a Topographic Database Using Airborne Laser Scanner Data", 2006.
Falkner, et al., "Aerial Mapping: Methods and Applications—Chapter 11: Aerotriangulation" Second Edition, 2002.
Faugeras, "What Can Be Seen in Three Dimensions with an Uncalibrated Stereo Rig?", 1992.
Faugeras, et al., "3-D Reconstruction of Urban Scenes from Sequences of Images", Institut National De Recherche En Informatique Et En Automatique, 1995.

Federal Register, "Notices", Geological Survey, vol. 64, No. 18, Jan. 28, 1999.
Fisher, et al., "Dictionary of Computer Vision and Image Processing", John Wiley&Sons, 2005.
Flamanc, et al., "3D City Models: An Operational Approach Using Aerial Images and Cadastral Maps", Sep. 17-19, 2003.
Fritsch, "Introduction into Digital Aerotriangulation" Photogrammetric Week, Wichmann Verlag, Heidelberg, 1995.
Fritsch, et al., "Oblique Image Data Processing—Potential, Experiences and Recommendations", Photogrammetric Week, Wichmann/VDE Verlag, Berlin and Offenbach, 2013.
Furukawa, et al., "Manhattan-world Stereo", 2009.
Furukawa, et al., "Reconstructing Building Interiors from Images", 2009.
Furukawa, et al., "Towards Internet-scale Multi-view Stereo", 2010.
Georgeiv, et al., "Spatio-Angular Resolution Tradeoff in Integral Photography" Eurographics Symposium on Rendering, 2006.
Geospan Corporation, "Digital Geo-Referenced Oblique Aerial Imagery Solution EPP-RFP No. 8444 5/13", 2007.
Getting to Know ArcView GIS: the geographic information sstem (GIS) for everyone, "Discover the world of desktop mapping and GIS," 1996-1998.
Gleicher, et al., "Image Snapping", Advanced Technology Group, Apple Computer, Inc., 1995.
Goesele, et al., "Multi-View Stereo for Community Photo Collections", Proceedings of ICCV, 2007.
Goesele, et al., "Multi-View Stereo Revisited", 2006.
Goldman, et al., "Interactive Video Object Annotation", Technical Report UW-CSE-2007-04-01, 2007.
Gomes, et al., "A Photogrammetric Project in Brazil: the Use of the PhotoModeler Software," 1999.
Gong, et al., "3D Model-Based Tree Measurement from High-Resolution Aerial Imagery", Photogrammetric Engineering and Remote Sensing, Nov. 2002.
Gonzalez, et al., "Digital Image Processing", Addison-Wesley Publishing Company, Inc., 1993.
Gulch, et al., "On the Performance of Semi-Automatic Building Extraction", In the International Archives of Photogrammetry and Remote Sensing, vol. 23, 1998.
Gulch, et al., "On the Performance of Semi-Automatic Building Extraction," Commission III, Working Group 4, 1998.
Hartley, "In Defense of the Eight-Point Algorithm", IEEE Transactions on Pattern Analysis and Machine Intelligence, vol. 19, No. 6, Jun. 6, 1997.
Hartley, et al., "Invariant and Calibration-Free Methods in Scene Reconstruction and Object Recognition", Final Technical Report, Feb. 28, 1997.
Hartley, et al., "Multiple View Geometry in Computer Vision", Second Edition, Cambridge University Press, 2003.
Hartley, et al., "Multiple View Geometry in Computer Vision: 2.4 A Hierarchy of Transformations", Cambridge University Press, 2003.
Hartley, et al., "Multiple View Geometry in computer vision: Appendix 6—Iterative Estimation Methods", Cambridge University Press, Second Edition, 2003.
Henricsson, et al., "3-D Building Reconstruction with ARUBA: A Qualitative and Quantitative Evaluation", Institute of Geodesy and Photogrammetry, 2001.
Higgins, "A computer algorithm for reconstructing a scene from two projections", Macmillan Journals Ltd article, vol. 293, Sep. 10, 1981.
Hill, "Pictometry: aerial photography on steroids", www.law-enforcement.com, Jul. 2002.
Hsieh, "Design and Evaluation of a Semi-Automated Site Modeling System", Carnegie Mellon, Nov. 1995.
Hsieh, "SiteCity: A Semi-Automated Site Modelling System", IEEE, 1996.
Hu, et al., "Building Modeling From LIDAR and Aerial Imagery", 2004.
Hudson, "Appendix D: Merging VRML Models Extending the Use of Photomodeller", University of Virginia, Mar. 23, 1998.
Zongker, et al., "Environment Matting and Compositing", 1999.
Jaw, et al, "Building Roof Reconstruction by Fusing Laser Range data and Aerial Images", The International Archives of the

(56) References Cited

OTHER PUBLICATIONS

Photogrammetry, Remote Sensing and Spatial Information Sciences. vol. XXXVII. Part B3b. 2008.
Jaynes, et al., "Recognition and Reconstruction of Buildings from Multiple Aerial Images," Oct. 18, 2001.
Johnson, et al., Surface Matching for Object Recognition in Complex 3-D Scenes, 1998.
Khoshelham, et al., "A Model-Based Approach to Semi-Automated Reconstruction of Buildings from Aerial Images", The Photogrammetric Record, Dec. 2004.
Kolbl, et al., "Chapter 2: Scanning and State-of-the-Art Scanners". Digital Photogrammetry: An Addendum to be Manual of Photogrammetry, 1996.
Kolman, "Elementary Linear Algebra: Chapter 4, Linear Transformations and Matrices", Second Edition, Macmillan Publishing Co., 1997.
Korte, "The GIS Book: Understanding the Value and Implementation of Geographic Information Systems", 4th Ed., 1997.
Krainin, et al., "Autonomous Generation of Complete 3D Object Models Using Next Best View Manipulation Planning", ICRA 2011.
Kushal, et al., "Photo Tours", 3DimPVT, Oct. 2012.
Labe, et al., "Robust Techniques for Estimating Parameters of 3D Building Primitives", International Society for Photogrammetry and Remote Sensing, vol. XXXII, Part 2, Commission II, Proceedings of the Commission II Symposium, Data Integration: Systems and Techniques, Jul. 13-17, 1998.
Lee, et al., "Fusion of Lidar and Imagery for Reliable Building Extraction", Photogrammetric Engineering and Remote Sensing, Feb. 2008.
Levoy, "The Digital Michelangelo Project", retrieved from http://www-graphics.stanford.edu/projects/mich/ on Oct. 25, 2013.
Levoy, et al., "The Digital Michelangelo Project: 3D Scanning of Large Statues", 2000.
LexisNexis, "Software; New Products", Roofing Contractor, Jan. 3, 2006.
Li, et al., "Automated Generation of Interactive 3D Exploded View Diagrams" SIGGRAPH 2007.
Li, et al., "Interactive Cutaway Illustrations of Complex 3D Models", ACM Transactions on Graphics 26(3), SIGGRAPHY, 2007.
Liu, et al., "Building Extraction from High Resolution Satellite Imagery Based on Multi-scale Image Segmentation and Model Matching", IEEE 2008.
Lu, et al., "Automatic Building Detection Using the Dempster-Shafer Algorithm," Photogrammetric Engineering & Remote Sensing, vol. 72, No. 4, Apr. 2006.
Ziegler, et al., "3D Reconstruction Using Labeled Image Regions", 2003.
Lueders, "Infringement Allegations by Eagleview Technologies", Feb. 10, 2009.
Mahajan, et al., "A Theory of Frequency Domain Invariants: Spherical Harmonic Identities for BRDF/Lighting Transfer and Image Consistency", IEEE Transactions on Pattern Analysis and Machine Intelligence, vol. 30, No. 2, Feb. 2008.
Mahajan, et al., "A Theory of Spherical Harmonic Identities for BRDF/Lighting Transfer and Image Consistency", ECCV 2006.
Maini, et al., "Study and Comparison of Various Image Edge Detection Techniques", International Journal of Image Processing, vol. 3: Issue 1, 2009.
Mann, "Roof with a view", Contract Journal, Nov. 23, 2005.
Maune, Chapter 6: DEM Extraction, Editing, Matching and Quality Control Techniques. Digital Photogrammetry: An Addendum to the Manual of Photogrammetry, 1996.
McGlone, "Chapter 5: Aerial Triangulation Adjustment and Image Registration," Digital Photogrammetry: An Addendum to the Manual of Photogrammetry, 1996.
McGlone, "Sensor Modeling in Image Registration, Chapter 5:Aerial Triangulation Adjustment and Image Registration", 1996.
McGlone, et al., "Projective and Object Space Geometry for Monocular Building Extraction," School of Computer Science, Carnegie Mellon University, Jun. 20-23, 1994.
McKeown, Jr., et al., "Chapter 9: Feature Extraction and Object Recognition, Automatic Cartographic Feature Extraction Using Photogrammetric Principles". Digital Photogrammetry: An Addendum to the Manual of Photogrammetry, 1996.
Meixner, et al., 3-Dimensional Building Details from Aerial Photography for Internet Maps, Institute for Computer Graphics and Vision, Apr. 8, 2011.
Mikhail, et al., "Introduction to Mondern Photogrammetry", John Wiley&Sons, Inc., New York, 2001.
Mikuni, "Chapter 7: Digital Orthophotos: Production, Mosaicking, and Hardcopy". Digital Photogrammetry: An Addendum to the Manual of Photogrammetry, 1996.
Miller, "Pictometry in Arlington Virginia:Software gives small Arlington the big picture", Dec. 2001.
Miller, et al., "Miller's Guide to framing and Roofing", McGraw Hill, New York, 2005.
Minialoff, "Introduction to Computer Aided Design", Apr. 2000.
Moons, et al., "Automatic Modelling and 3D Reconstruction of Urban House Roofs from High Resolution Aerial Imagery", 2006.
Mortensen, et al., "Intelligent Scissors for Image Composition", Brigham Young University, 1995.
Mostafa, et al., "A Multi-Sensor System for Airborne Image Capture and Georeferencing," Photogrammetric Engineering & Remote Sensing, vol. 66, No. 12, Dec. 2000.
Nizar, et al., "Reconstruction of Buildings from Airborne Laser Scanning Data", 2006.
Noronha, et al., "Detection and Modeling of Buildings from Multiple Aerial Images". IEEE Transactions on Pattern Analysis and Machine Intelligence, vol. 23, No. 5, May 2001.
Ortner, et al., "Building Extraction from Digital Elevation Model", INRIA, Jul. 2002.
Perlant, et al., "Scene Registration in Aerial Image Analysis". Digital Mapping Laboratory, School of Computer Science, Carnegie Mellon University, Pittsburg PA, 1990.
Photogrammetric Engineering and Remote Sensing, "PE&RS, Journal of the American Society for Photogrammetry and Remote Sensing", vol. 68, No. 9, Sep. 2002.
PhotoModeler Pro 4.0—The New Release, "The Premier Software for Measuring and Modeling the Real-World is even better!," 1995-2000.
Photomodeler.com, "PhotoModeler Pro 5: Measuring and Modeling the Real World", 2003.
"Pictometry Aerial Images and Electronic Field Study Software", 2008.
Pictometry Intelligent Images, EFS Version 2.7 Release Notes, 2007.
Pictometry International Corp., "Electronic Field Study User Guide". Version 2.7, Jul. 2007.
Pictometry Online, "Government", Oct. 7, 2008.
Pictometry search results, researched on Sep. 23, 2013.
Pictometry Visual Intellicence, "Pictometry—In the News, Pictometry Announces Software and Web-based Solution for Engineers, Architects, and Planners", 2009.
Pictometry Visual Intelligence, "Frequently Asked Questions", 2005.
Pictometry Visual Intelligence, http://web.archive.org/web/20020725232638/http://www.pictometry.com, 1995-2002.
Porway, et al., "A Hierarchical and Contextual Model for Aerial Image Parsing," 2008.
Poullis, et al., "Photogrammetric Modeling and Image-based Rendering for Rapid Virtual Environment creation", 1998.
PrecigeoRoof, "Why precigeoRoof", Jan. 7, 2007.
Zheng, et al., "A Consistent Segmentation Approach to Image-based Rendering", Technical Report CSE-09-03-02, 2002.
Reddy, et al., "Frequency-Space Decomposition and Acquisition of Light Transport Under Spatially Varying Illumination", EECV 2012.
RoofCAD, "Satellite Takeoff Tutorial—Pitched Roof", 2012.
RoofCAD, "User Guide", True North Estimating Systems, Ltd., 2003.
Rottensteiner, et al., "Automatic Generation of Building Models from Lidar Data and the Integration of Aerial Images," ISPRS, vol. XXXIV, 2003.

(56) References Cited

OTHER PUBLICATIONS

Rupnik, et al., "Oblique Multi-Camera Systems—Orientation and Dense Matching Issues", The International Archives of teh Photogrammetry, Remote Sensing and Spatial Information Sciences, vol. XL-3W1, 2014.
San, et al., "Building Extraction from High Resolution Satellite Images Using Hough Transform," International Archives of the Photogrammetry, Remote Sensing and Spatial Information Science, vol. XXXVIII, 2010.
Scholze, et al., "A Probabilistic Approach to Building Roof Reconstruction Using Semantic Labelling", 2002.
Seitz, et al., "A Comparison and Evaluation of Multi-View Stereo Reconstruction Algorithms", CVPR 2006.
Shan, et al., "Refractive Height Fields from Single and Multiple Images", 2012.
"Sorcerer: Nobody builds roofs like this builds roofs", retrieved from URL=http://web.archive.org/web/2006021409237/http://www.applicad.com/au/product-features . . . on Mar. 29, 2012.
Zheng, et al. "Parallax Photography: Creating 3D Cinematic Effects from Stills", 2009.
"Transcription of points of potential interest in the attached Youtube video titled: Pictometry Online Demo", retrieved on Feb. 10, 2010.
Taillandier, et al., "Automatic Building Reconstruction from Aerial Images: A Generic Bayesian Framework", 2004.
Ulm, et al., "3D City Modelling with Cybercity-Modeler", 1st EARSel workshop of the SIG Urban Remote Sensing, Mar. 2-3, 2006.
University of Washington, "College of Arts & Sciences Mathematics: Detailed course offerings . . . ", retrieved from http://www.washington.edu/students/crscat/math.html on Oct. 25, 2013.
Verma, "3D Building Detection and Modeling from Aerial LIDAR Data," IEEE, 2006.
Vosselman, "Fusion of Laser Scanning Data, Maps, and Aerial Photographs for Building Reconstruction", 2002.
Vosselman, et al. "Map based building reconstruction from laser data and images", 2001.
Vosselman, et al., "Mapping by Dragging and Fitting of Wire-Frame Models", Photogrammetric Engineering and Remote Sensing, Jul. 1999.
Wang, et al., "Pictometry's Proprietary Airborne Digital Imaging System and It's Application in 3D City Modelling", 2008.
Wattenberg, et al., "Area, Volume, and Torque in Three Dimensions", retrieved from http://www.math.montana.edu/frankw/ccp/multiworld/twothree/atv/learn.htm on Sep. 24, 2013.
Weeks, et al., "A Real Time, Multichannel System with Parallel Digital Signal Processors", IEEE, 1990.
Werner, et al., "New Techniques for Automated Architectural Reconstruction from Photographs," Department of Engineering Science, University of Oxford, 2002.
Wolf, Elements of Photogrammetry—Chapter 14: Aerotriangulation, 1974.
Wood, et al., "Surface Light Fields for 3D Photography", SIGGRAPH 2000.
Zhang, et al., "Spacetime Stereo: Shape Recovery for Dynamic Scenes", 2003.
Wu, et al., "Multicore Bundle Adjustment", 2011.
Wu, et al., "Schematic Surface Reconstruction", 2012.
www.archive.org, "Main Features: Photomodeler is Fully Loaded and Ready to Perform", retrieved from http://www.photomodeler.com/pmpro08.html on Oct. 21, 2013.
Xactware Solutions, Inc., "Xactimate Sketch—Import Underlay Image," 2008.
Xactware, "Roof and Property Insight", 2015.
Xiao, et al., "Geo-spatial Aerial Video Processing for Scene Understanding and Object Tracking," IEEE, 2008.
Ye, et al., "Automated Reconstruction of Urban House Roofs from Aerial Imagery", IEEE 2001.
YouTube, "Pictometry Online Demo", retrieved Feb. 6, 2009.
Zhang, et al., "Rapid Shape Acquisition Using Color Structured Light and Multi-pass Dynamic Programming", 2002.
Zhang, et al., "Shape and Motion Under Varying Illumination: Unifying Structure from Motion, Photometric Stereo, and Multi-view Stereo", 2003.

* cited by examiner

SYSTEM AND METHOD FOR DETECTING FEATURES IN AERIAL IMAGES USING DISPARITY MAPPING AND SEGMENTATION TECHNIQUES

CROSS-REFERENCE TO RELATED APPLICATIONS

This application claims priority to U.S. Provisional Patent Application No. 61/861,610 filed on Aug. 2, 2013, the entire disclosure of which is expressly incorporated herein by reference

BACKGROUND

Field of the Disclosure

The present disclosure relates generally to the field of aerial image detection and classification. More specifically, the present disclosure relates to a system and method for detecting features in aerial images using disparity mapping and segmentation techniques.

Related Art

Accurate and rapid identification and estimation of objects in aerial images is increasingly important for a variety of applications. For example, roofing information is often used by construction professionals to specify materials and associated costs for both newly-constructed buildings, as well as for replacing and upgrading existing structures. Further, in the insurance industry, accurate information about construction materials and costs is critical to determining the proper costs for insuring buildings/structures.

Various software systems have been implemented to process aerial images to identify building structures and associated features thereof. However, such systems are often time-consuming and difficult to use, and require a great deal of manual input by a user. Further, such systems may not have the ability to improve results through continued usage over time.

In view of existing technology in this field, what would be desirable is a system that automatically and efficiently processes aerial images to automatically identify various types of objects in the images. Moreover, what would be desirable is a system that self-improves over time to become more accurate and efficient. Accordingly, what would be desirable, but has not yet been provided, is a system and method for detecting features in aerial images using disparity mapping and segmentation techniques which addresses these needs.

SUMMARY

The present system of the current disclosure detects features in aerial images using disparity mapping and segmentation techniques. More specifically, the system includes an object detection pre-processing engine for object detection and classification using one or more aerial images. The object detection pre-processing engine includes disparity map generation, segmentation, and classification to identify various objects and types of objects in an aerial image. Detection algorithms, including region growing algorithms and split-and-merge segmentation algorithms, are applied to an image to identify structures. These component-based algorithms can evolve and become more efficient over time. The information derived from these pre-processed images can then be used by the mass production engine for the manual and/or automated production of drawings, sketches, and models. A quality control engine could also be used for ensuring the accuracy of any drawings, sketches, or models generated by the system.

BRIEF DESCRIPTION OF THE DRAWINGS

The foregoing features will be apparent from the following Detailed Description, taken in connection with the accompanying drawings, in which.

DETAILED DESCRIPTION

The present disclosure relates to a system and method for detecting features in aerial images using disparity mapping and segmentation techniques, as discussed in detail below in connection with FIGS. 1-28.

Figure 1:
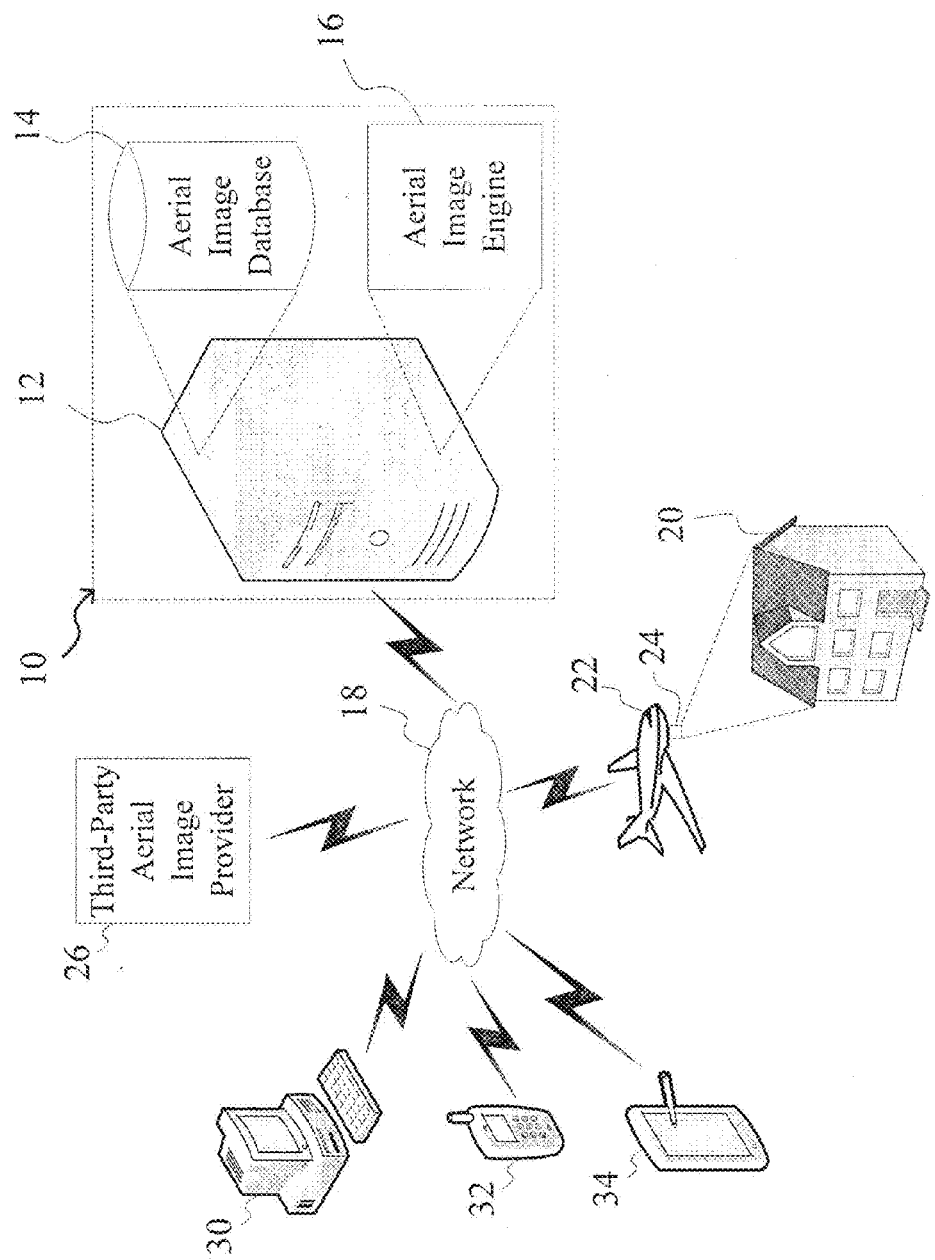
FIG. 1 is a diagram showing the system of the present disclosure for detecting features in aerial images.

FIG. 1 is a diagram showing the system of the present disclosure for detecting features in aerial images, indicated generally at 10. The system 10 comprises a computer system 12 (e.g., a server) having an aerial image database 14 stored therein and a software aerial image engine (module) 16. The database 14 could be stored on the computer system 12, or located externally (e.g., in a separate database server in communication with the system 10). As will be discussed in greater detail below, the aerial image engine 16 allows users to detect features in aerial images and generate three-dimensional models therefrom.

The system 10 can communicate through a network 18 with one or more of a variety of image providers to obtain aerial images or photographs of a building structure 20 and can store them in the aerial image database 14 in any suitable format, such as JPEG, TIFF, GIF, etc. Network communication could be over the Internet using standard TCP/IP communications protocols (e.g., hypertext transfer protocol (HTTP), secure HTTP (HTTPS), file transfer protocol (FTP), electronic data interchange (EDI), etc.), through a private network connection (e.g., wide-area network (WAN) connection, e-mails, electronic data interchange (EDI) messages, extensible markup language (XML) messages, Javascript Object Notation messages (JSON) file transfer protocol (FTP) file transfers, etc.), or any other suitable wired or wireless electronic communications format. Image providers that the computer system 12 could communicate with include, but are not limited to, an airplane 22 (or unmanned autonomous vehicle (UAV)) having a camera 24 capable of capturing images of the structure 20, and/or a third-party aerial image provider 26, such as Pictometry, Google, or Bing.

The computer system 12 could be any suitable computer server (e.g., a server with an INTEL microprocessor, multiple processors, multiple processing cores) running any suitable operating system (e.g., Windows by Microsoft, Linux, etc.). The computer system 12 includes non-volatile storage, which could include disk (e.g., hard disk), flash memory, read-only memory (ROM), erasable, programmable ROM (EPROM), electrically-erasable, programmable ROM (EEPROM), or any other type of non-volatile memory. The aerial image engine 16, discussed in greater detail below, could be embodied as computer-readable instructions stored in computer-readable media (e.g., the non-volatile memory mentioned above), and programmed in any suitable programming language (e.g., C, C++, Java, etc.).

The system 10 could be web-based and could allow for remote access to the system 10 over a network 18 (e.g., Internet, WAN, LAN, etc.) by one or more devices, such as a personal computer system 30, a smart cellular telephone 32, a tablet computer 34, or other devices. It is also contemplated that at least some of the functionality of the system 10 could run locally on devices (e.g., personal computer 30, smart cellular telephone 32, tablet computer 34, etc.) programmed with software in accordance with the present disclosure. It is conceivable that, in such circumstances, the device could communicate with a remote aerial image database over a network 18.

Figure 2:
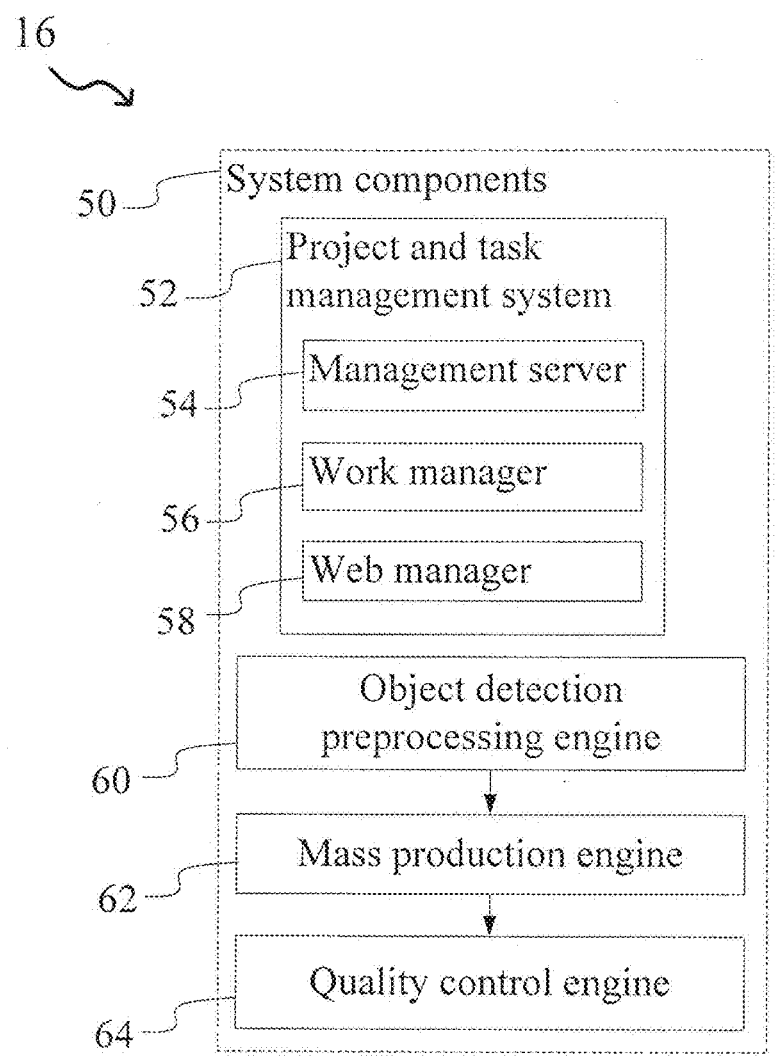
FIG. 2 is a diagram showing software components of the aerial image engine.

FIG. 2 is a diagram showing software components 50 of the aerial image engine 16. The components 50 include a project and task management system 52, object detection preprocessing engine 60, mass production engine 62, and quality control (QC) engine 64 (discussed in more detail below). The project and task management system 52 allows for the creation, processing, and monitoring of projects relating to the processing of aerial images. The projects could be based on high resolution aerial imagery of areas, where the images have been captured, copied, and preprocessed. Each project is tracked in detail (e.g., steps toward completion, time spent on each task, etc.) to help pinpoint target areas for optimization, simplification, and/or improvement.

The project and task management system 52 includes several distinct modules. More specifically, the system includes a management server 54, work manager 56, and web manager 58. The management server 54 is a set of web services that store and serve geo-referenced data, including raw data (e.g., data generated by computer vision (CV)) and elaborated data (e.g., new and previous sketches, ITV's (insurance-to-value), insurance claims, and other related data). The management server 54 also provides a feedback mechanism that lets users quickly and efficiently return new and improved training data to the object detection preprocessing engine 60.

The work manager 56 is a set of web services that dispatches tasks to low-cost, highly-trained operators, and then processes and stores the results of the work that they accomplish. The work manager 56 ensures that projects and tasks are assigned orderly based on priority and urgency levels. For example, customer requests could be assigned the highest priority, followed by customer PIF (policy in force) addresses, and then AOI's (areas of interest) with the most historical significance. The web manager 58 is a full web application user interface that allows managers to handle creating projects, managing property contractors and operators, work monitoring, and tracking of historic data, productivity statistics (e.g., per operator, team, and/or project block, etc.), and other statistics.

The object detection preprocessing engine 60, discussed in more detail below, detects structures in images, and then processes the images to identify different types of objects. More specifically, the object preprocessing engine 60 processes imagery to analyze stereoscopic pairs of images and detect various objects of interest (e.g., buildings, trees, pools, noise (elements with a significant level of entropy), etc.). For example, the object detection preprocessing engine 60 could take preprocessed building structure perimeter information, add automatic line finding capabilities, and provide the ability to gather height information from stereoscopic pairs.

The mass production engine 62 (e.g., mass production client application) is an automatically updated smart client (e.g., desktop, mobile, or web application) for quickly creating aerial models (e.g., 3D models) of one or more structures and accompanying prefill and metadata for an aerial image library (which could be address-based). The mass production engine 62 includes software tools to support the manual and automated process of creating a roof and/or property report. The mass production engine 62 could be a closed system which works in conjunction with designated web services and is programmed to protect any personally identifiable information (PII) data (e.g., the system could withhold from operations of the system actual address information or geocode information of a structure, remove imagery that is no longer needed from the local cache, etc.).

The quality control engine 64 ensures the accuracy of the model and related data generated from the images. The quality control engine 64 could be automated and/or could guide a technician in review and verification.

Figure 3:
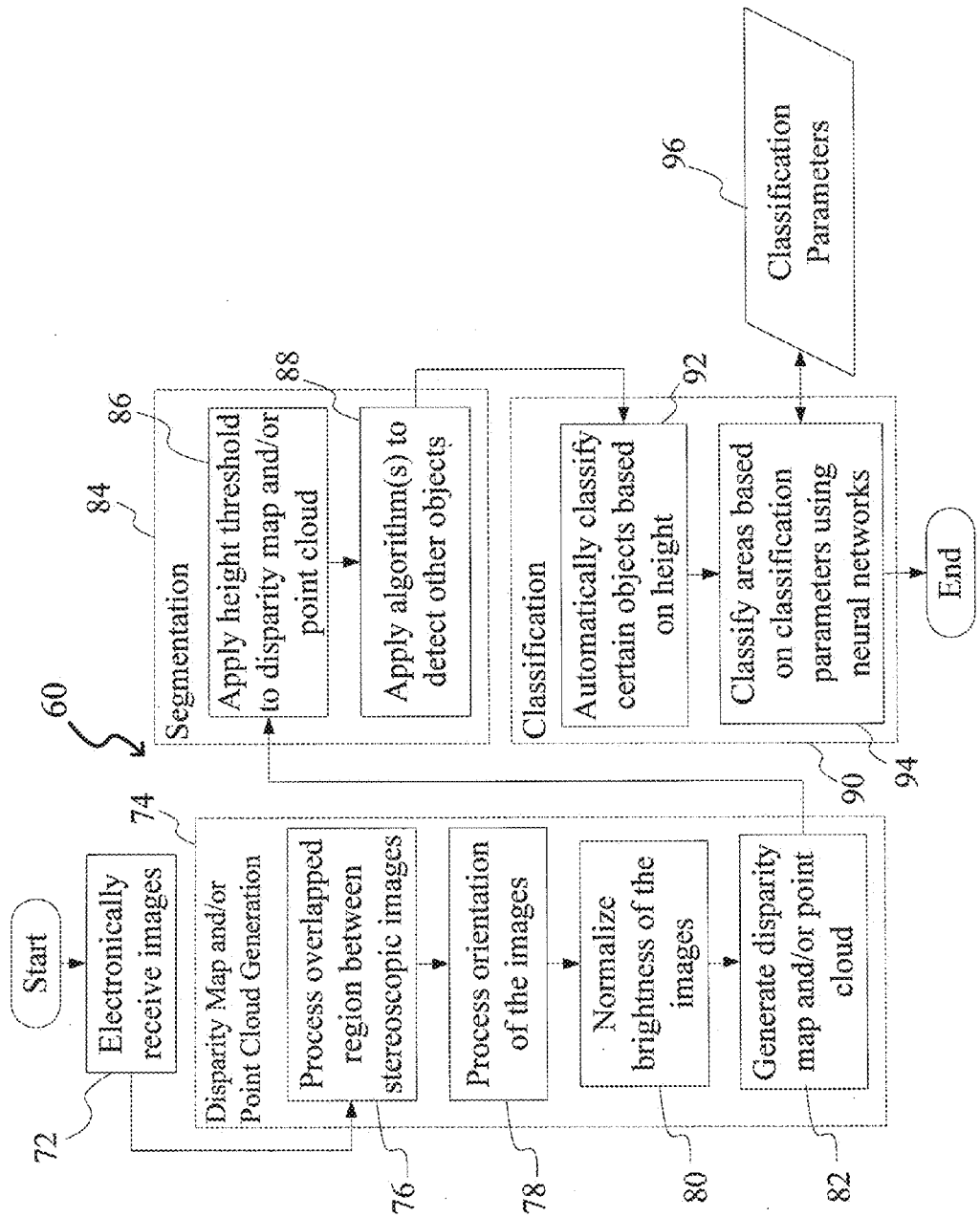
FIG. 3 is a flowchart showing the steps for processing one or more images by the object detection preprocessing engine.

FIG. 3 is a flowchart showing the steps for processing one or more images by the object detection preprocessing engine 60. Broadly, the process includes disparity map and/or point cloud generation sub-process 74, segmentation sub-process 84, and classification sub-process 90. In step 72, the system electronically receives one or more aerial images (e.g., imagery intake, imagery input data, etc.). High-level imagery specifications (e.g., proprietary satellite images) could be used for maximum automation and efficiency in relation to production, but the system could use lower-quality data inputs (e.g., third-party data) as well. The clearer the aerial images that are used as input, the better the results of the automated detection algorithms.

In sub-process 74, the system generates a disparity map and/or point cloud, which provides information about the elevation of the structures (e.g., objects, elements, etc.) present in the stereoscopic pair of images. To generate a disparity map and/or point cloud, in step 76, the system uses world file information to process the overlapped region between stereoscopic images. One or more image pairs can be used in this process, and the resulting disparity maps and/or point clouds can be combined to gain additional information. In step 78, the orientation of each image (e.g., left and right images) is processed, such as by using the camera position. In step 80, if needed (e.g., particularly if the overlapping images are from different flight lines), the brightness of the images is normalized. A disparity map and/or point cloud is then generated in step 82. The parameters used to generate the disparity map and/or point cloud are fine-tuned to account for differences between imagery data (e.g., differences produced by different camera systems, differences in sun angles, etc.) and other factors. The system could use other in-flight or post-flight processing systems capable of producing accurate disparity maps and/or point clouds.

In sub-process 84, segmentation is applied to the image, which allows the system to detect changes in different parts of the image that are later grouped together into areas based on similarities. These areas are subsequently classified (e.g., as structures, trees, pools, etc.), as discussed below in more detail. To apply segmentation, in step 86, a height threshold is applied to the disparity map and/or point cloud. This threshold is adjustable, but (for reasons relating to classification) should be taller than the height of a standard house or the tallest tree in a given area. In step 88, one or more automated detectors (e.g., algorithms) are applied to objects in the image that are below the threshold to initially detect other objects (e.g., buildings). Automated detectors become more accurate and efficient over time and can be tuned and continually added. When one or more new detectors are added, the database could be reprocessed to run just the new detectors. Algorithms that could be used include region growing algorithms and/or split-and-merge segmentation algorithms (which could be used to find blobs that may be subsequently identified as structures, trees, noise, etc.), as well as object/feature detection algorithms. These algorithms are discussed in more detail in FIGS. 6-7.

In step 90, classification is applied to detect and classify objects (e.g., buildings, trees, pools, noise, etc.). To apply classification, in step 92, objects higher and/or taller than the certain predefined threshold (based on the height information derived by the disparity map) are automatically added as structures (e.g., automatically classified as buildings). In step 94, areas are classified based on classification parameters using (and training) machine learning algorithms, such as neural networks. Machine learning algorithms and neural networks are powerful mechanisms which provide the system with the ability to learn and acquire experience from existing data and processes. For example, the network could be trained using an image database containing any number of stereoscopic image pairs, where the images are taken from different locations (including residential, industrial and commercial areas) and from datasets that have been captured using different types of sensor technology. The trained network could be tested using a test image database and an automated test tool. After the images have been pre-processed, a data package containing all information derived from the aerial images could be stored in a property database for future use by users or software applications.

Figure 4:
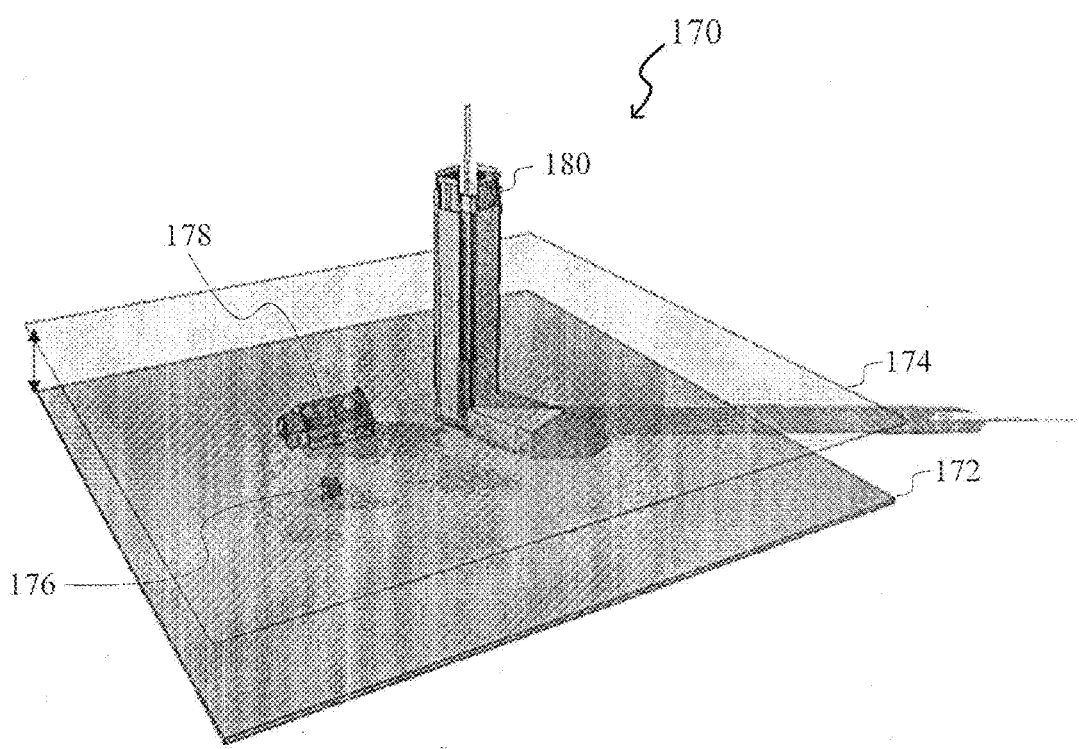
FIG. 4 is an image depicting object classification carried out by the system using a pre-defined elevation threshold.

FIG. 4 is an image 170 depicting object classification carried out by the system using a pre-defined elevation threshold. As shown, the height threshold 174 is adjustable to be a certain distance from the ground 172. The threshold 174 is set to be larger than trees 176 and houses 178 in the area. Anything above that threshold 174, such as a building tower 180, is automatically classified as a building, because it is too tall to be anything else.

Figure 5:
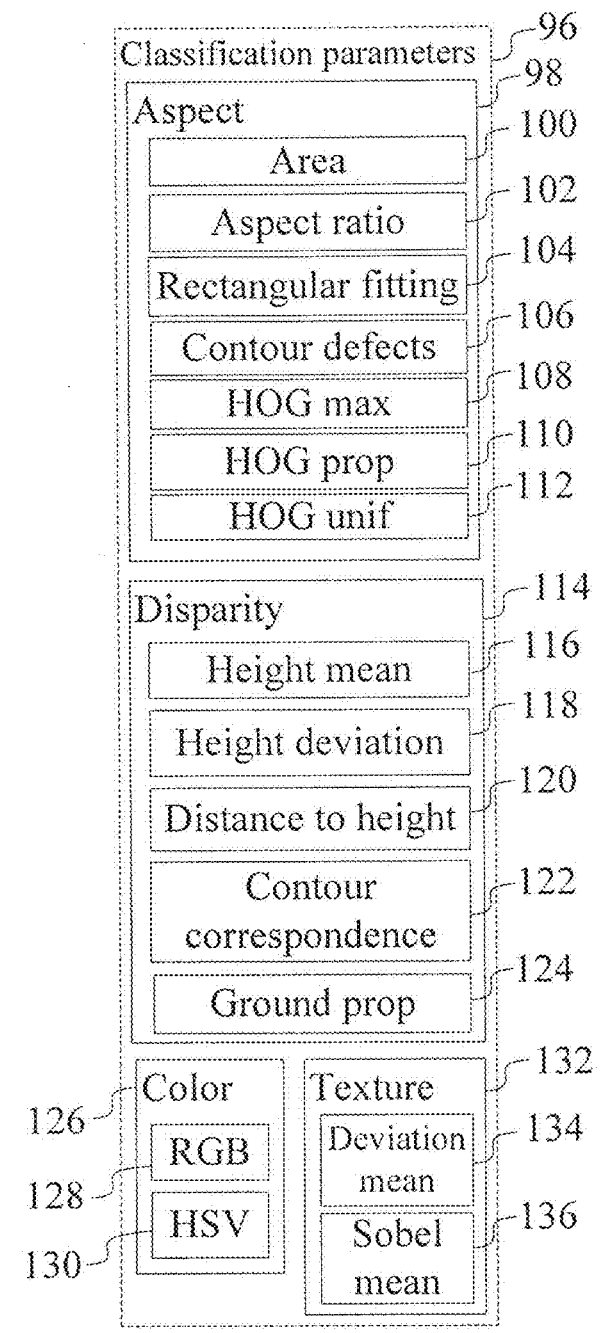
FIG. 5 is a diagram of various classification parameters utilized by the system.

FIG. 5 is a diagram of various classification parameters 96 that can be utilized by the system. Classification is based on a set of specific parameters 96 that can be modified and evolved to refine and improve the classification or detection of new elements (e.g., cars, vegetation, etc.). Classification parameters 96 could include aspect 98, disparity 114, color 126, and/or texture 132 parameters. More specifically, the aspect parameter 98 could include area 100 (e.g., blob area in pixels, where small blob areas are automatically discarded), aspect ratio 102 (e.g., best blob fitting oriented rectangle width and height ratio), rectangle fitting 104 (e.g., best blob fitting oriented rectangle area and blob area ratio, which tends to separate buildings from trees and noise), contour defects 106 (e.g., sum of defects of the blob convex polygon, which tends to separate buildings from trees and noise, where the noise generates more defects), HOG (histogram of oriented gradient) maximum 108 (e.g., distance between two main peaks in the HOG, and is ideally used for buildings having a distance of 90°), HOG property 110 (e.g., contour pixel proportion that belongs to the two main peaks in the HOG, which tends to distinguish buildings from trees), and/or HOG uniform 112 (e.g., Kolmogorov test of similarity between the HOG and the uniform distribution, which shows a low similarity in buildings and a high value in trees due to spread orientations).

The disparity parameter 114 could include height mean 116 (e.g., mean of the blob disparity values, because noise has lower values than buildings or trees), height deviation 118 (e.g., standard deviation of the blob disparity values), distance to height 120 (e.g., sum of contour pixel distance to the edges of the disparity map, because noise usually presents a high distance value), contour correspondence 122 (e.g., sum of contour correspondences with contrasted disparity, because buildings and trees present a high contour correspondence value), ground prop 124 (e.g., analysis of the disparity between a reference point (ground point) and a studied point of a given blob, because noise usually belongs to ground). The color parameter 126 could include RGB (red green blue) 128 (e.g., mean value of color channels, such as to separate buildings from trees, which are usually green)

and HSV (hue, saturation value) 130 (e.g., mean value of HSV channels). The texture parameter 132 could include deviation mean 134 (e.g., mean of the deviation of a window ceiling of the blob, which could separate trees from buildings due to contrasted lighting in leaves) and/or Sobel mean 136 (e.g., mean of the deviation of a window ceiling of the blob with a high pass filter applied to increase contrast).

Figure 6:
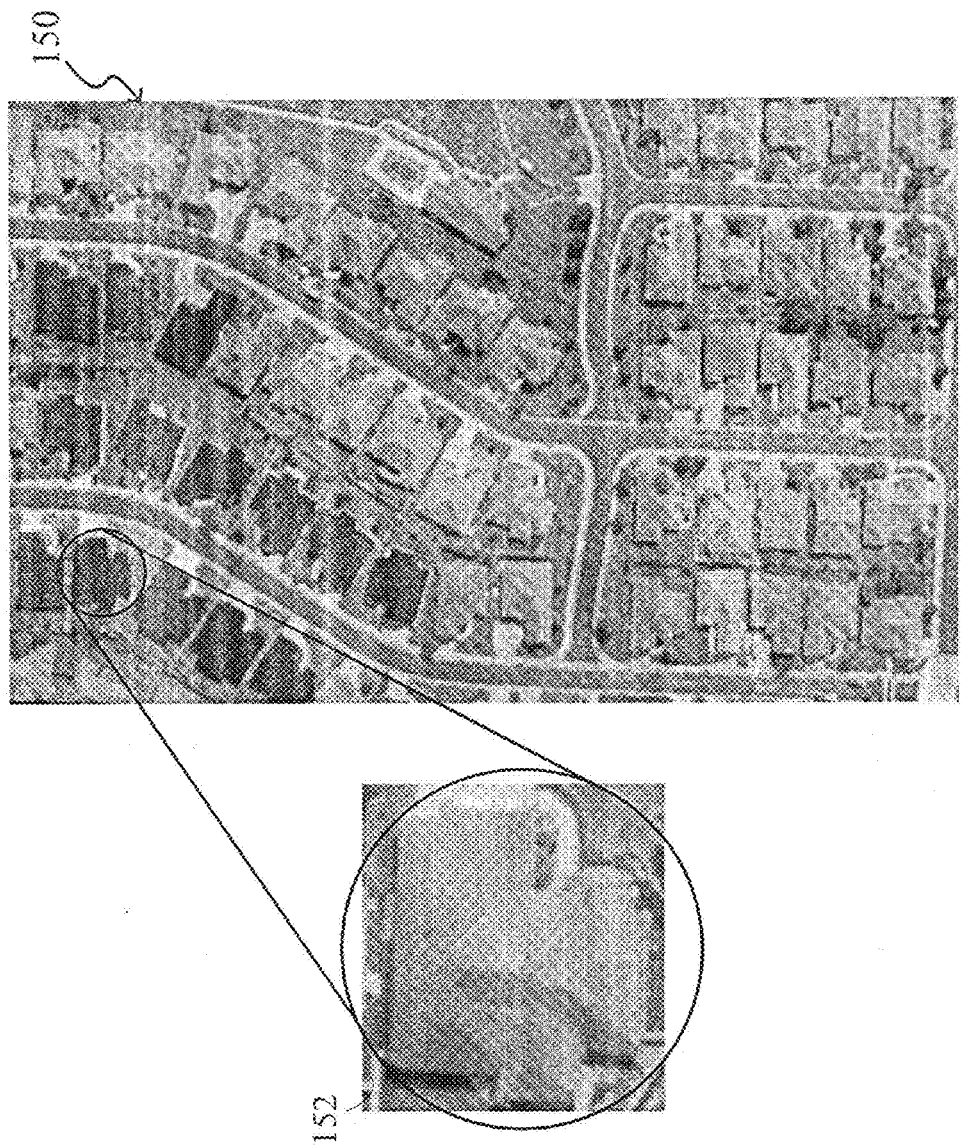
FIG. 6 illustrates processing of an aerial image by the system using a region growing algorithm to identify structures, as well as footprints of such structures.

FIG. 6 illustrates processing of an aerial image 150 by the system using a region growing algorithm to identify structures, as well as footprints 152 of such structures. The algorithm uses the highest points found in the disparity map as seed values and begins the region growing process from there outward. The region growing algorithm uses not only color information, but also disparity map information, which prevents growing over low-elevation areas. This works particularly well on high-resolution imagery (though the processing time per image is relatively large). However, if the image resize parameter is too large, it can cause inaccuracies in the structure footprint detected. Parameters of the region growing algorithm could include:

TABLE 1

| Parameter | Default Value |
| --- | --- |
| Image resize | 30% |
| Ground proportion | 45% |
| Similar RGB & HSV | Fuzzy set {0, 5, 10} |
| Building detection threshold | Disparity = 200 |
| Noise threshold | Area = 700 pixels |
| Thresholding analysis step | Disparity = 10 |
| Minimum seed area | 100 pixels |

Figure 7:
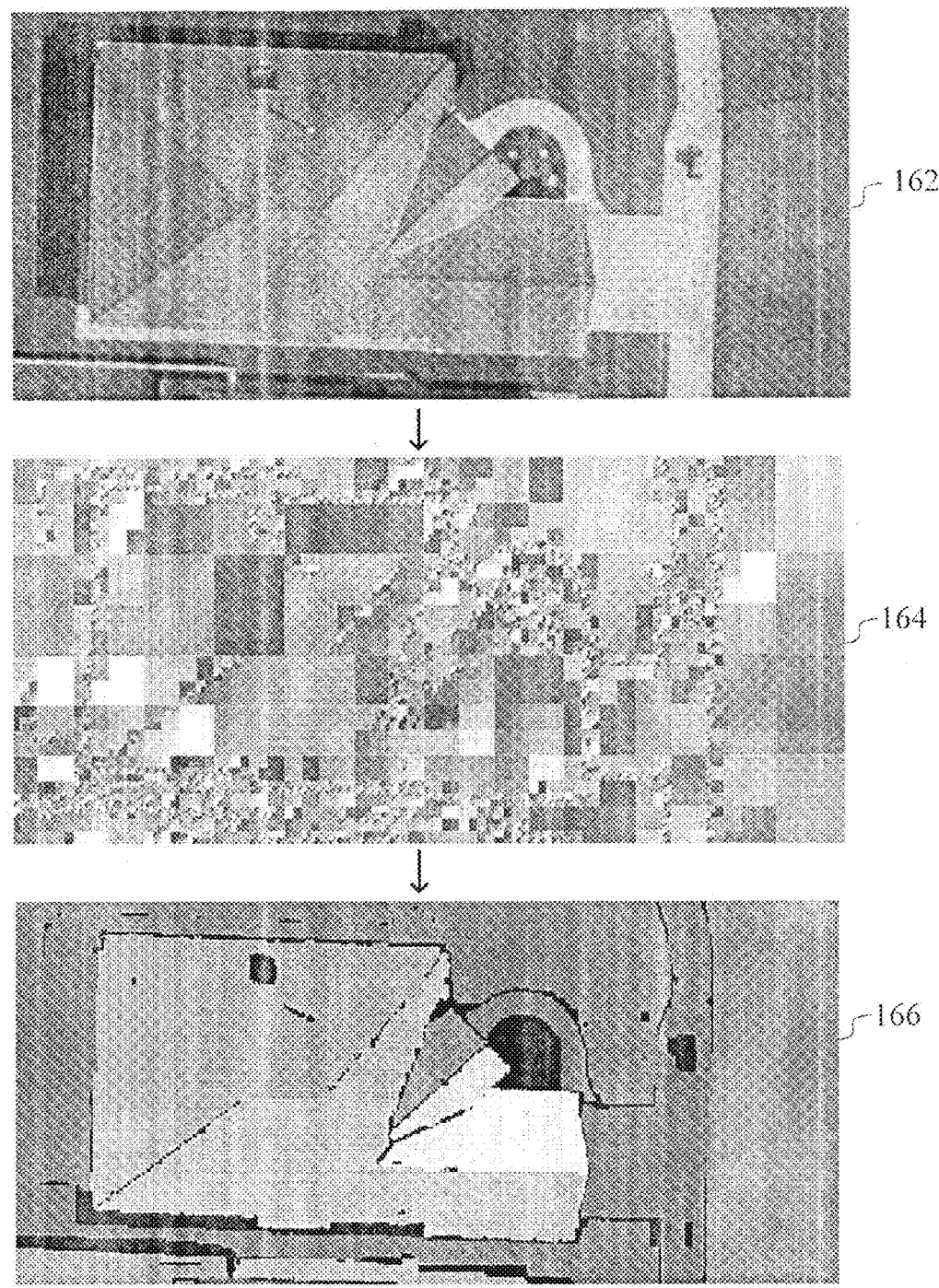
FIG. 7 illustrates processing of an aerial image by the system using a split-and-merge segmentation algorithm to identify structures.

FIG. 7 illustrates processing of an aerial image 162 by the system using a split-and-merge segmentation algorithm to identify structures. The split-and-merge segmentation algorithm (which is faster than the region growing algorithm) looks at the whole image 162 and determines if it is non-uniform or uniform. If it is non-uniform, the image is split into four squares. Then, it looks at each of those four squares and repeats the process on the squares until a complete segmentation map is created, where all squares are 100% uniform within them, as shown in image 164. This algorithm is useful for finding differences between different areas of an image and detecting the location of the changes. This, as shown in image 166, can be used to define the roof lines that separate the different sections of a roof. The split-and-merge algorithm uses not only color information but also the disparity map information (e.g., height map information) as input data. In this way, the interior lines are detected based on both the imagery and the disparity map information.

Figure 8:
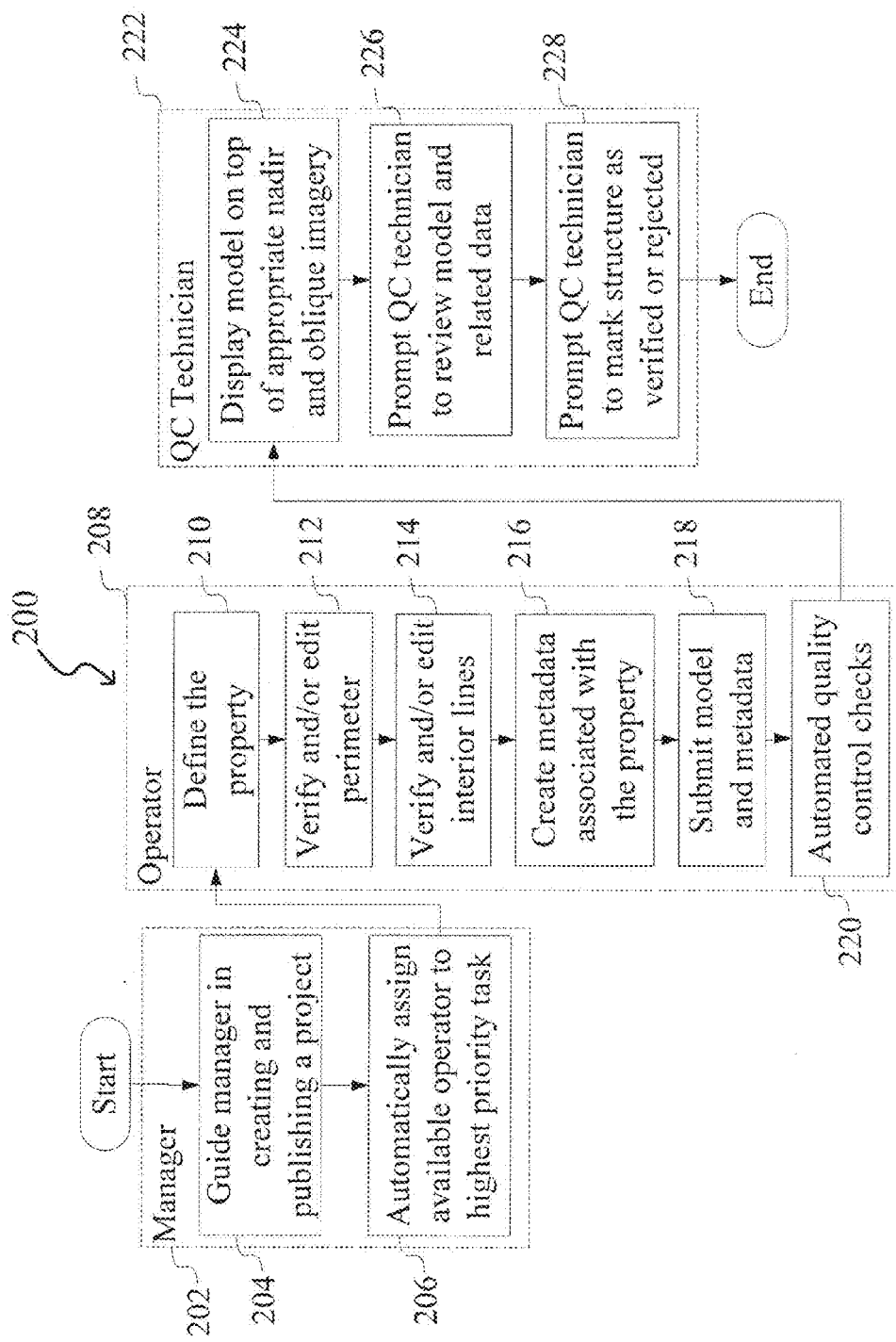
FIG. 8 is a flowchart showing steps for evaluating and improving models generated by the system.

FIG. 8 is a flowchart showing steps 200 for evaluating and improving models generated by the system. This process is optional and not required for object detection. The basic workflow includes determining the dimensions of the structure and creating a sketch or drawing. For example, the system provides the ability to determine and define a geocode at a front door (or one of the front doors) of a structure. Further, the system provides the ability to determine the footprint of the structure, roof dimensions (e.g., number of faces and other roof attributes), default area living space and non-living space (e.g., square feet), number of stories, number of car garage attributes, number and size of housing attributes (e.g., windows and doors), type of roofing material (e.g., shingles, metal, wood shake, etc.), exterior wall materials (e.g., stucco, brick, stone, etc.), and the number, size, and material of exterior property attributes (e.g., swimming pools, decks, etc.), among other things.

In step 204, the project and task management system (e.g., web manager application) guides a manager 202 in creating and publishing one or more projects. Publishing the project (automatically or manually) assigns it to a specific team (or operator) and makes the tasks in the project available in a queue. The manager can prioritize tasks within a project and across projects, thereby controlling the priority (on a per project basis) of how the models and metadata are processed.

In step 206, an operator of the assigned team, once available, is automatically assigned the highest priority task from the queue. The necessary pre-processed data, including data defaults and imagery, is then retrieved from one or more databases for the operator. These secondary methods are provided for operators to derive information where required and where automated detectors yield inaccurate or undetected results. Generally, the mass production engine guides an operator through the following steps: define 210, perimeter 212, interior lines 214, metadata 216, and submit 218, as discussed below. In step 210, the mass production engine allows the operator 208 to define the property by displaying for his/her review one or more images from the specified location and the default data thereof. When required, the operator 208 marks which buildings and related structures belong to that particular property. This provides the operator 208 with the ability to separate and combine structures and/or to identify new structures, which is useful if the object preprocessing engine did not accurately find a structure or merged together separate structures. If a new structure is created, a new task will be added to the appropriate queue and subsequently assigned to another operator. Where the parcel boundary geographic accuracy and/or detector default data is acceptable, this step would only require a quick review and verification by the operator 208.

In step 212, the mass production engine allows/guides the operator 208 to verify and/or edit (e.g., creates, adjusts, etc.) the roof perimeter. Although preprocessing would most likely have accurately identified the perimeter, it may be necessary to adjust the perimeter (e.g., moving the points defining the perimeter) to match the exact contour of the building. In step 214, the mass production engine allows/guides the operator 208 to verify and/or edit (e.g., correct, add, remove, etc.) the interior lines of the structure.

In step 216, the mass production engine allows/guides the operator 208 in creating the metadata associated with the property. The operator could examine the imagery and answer a specific set of questions about the property. The user interface would guide the operator 208 through desired attribute specifications or to verify automated pre-fill results. Answering the question could require clicking on a point on the model, such as marking the front door geo-code or verifying roof features. The metadata could include roof material (e.g., shingle, shake, metal, tile/slate or membrane), number and placement of roof features (e.g., chimneys, roof vents, turtle vents, skylights, etc.), front door geocode location, number of levels, walls, exterior material(s)/percentages, default area living compared with nonliving space, number, size, and placement of doors, windows, garage stalls, rain gutters, air conditioner units, trees, swimming pools, etc. After all phases of work have been successfully completed, in step 218, the operator 208 submits the model and metadata.

In step 220, automated QC checks (automated algorithms and/or operator input prompts) are implemented by the mass production engine to verify the validity and accuracy of the model and related data (e.g., metadata). This ensures that the images and related data will successfully import into other products (e.g., programs, engines, etc.). If the checks fail, the operator is notified of the error and the submission process is canceled. Otherwise, depending on the parameters of the project, the operator is given a new task, and the model is selected and added to the QC queue (or alternatively published for use).

In step 224, when the QC technician 222 is ready, the system (e.g., web application) pulls the highest priority structure from the QC queue and displays it on top of the appropriate nadir and oblique imagery. The system also allows any other imagery of the particular location to be displayed with the model. In step 226, the QC engine prompts the QC technician 222 to review both the model and related data (e.g., metadata). In step 228, the engine prompts the QC technician 222 to mark the structure as either verified (to be published to the library) or rejected and returned to the operator for review (its priority increased to push it higher in the operator's queue). When rejecting the model, the QC technician 222 can specify the reason from a canned list of possible issues provided by the system and/or draft a custom message. Multiple levels of quality assurance (e.g., teams) could be configured with varying responsibilities.

Figure 9:
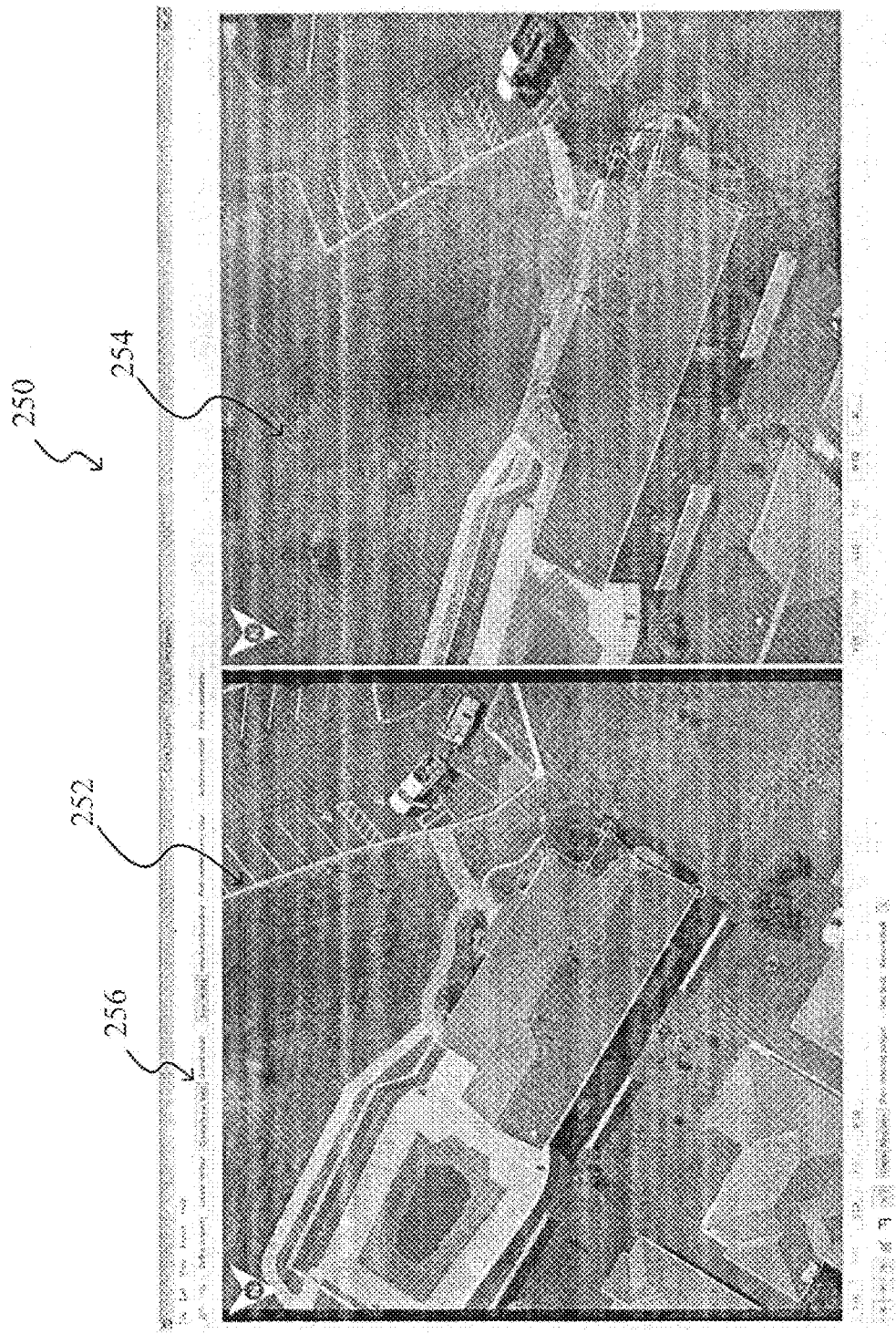
FIGS. 9-11 are screenshots showing various user interface screens generated by the system.
Figure 10:
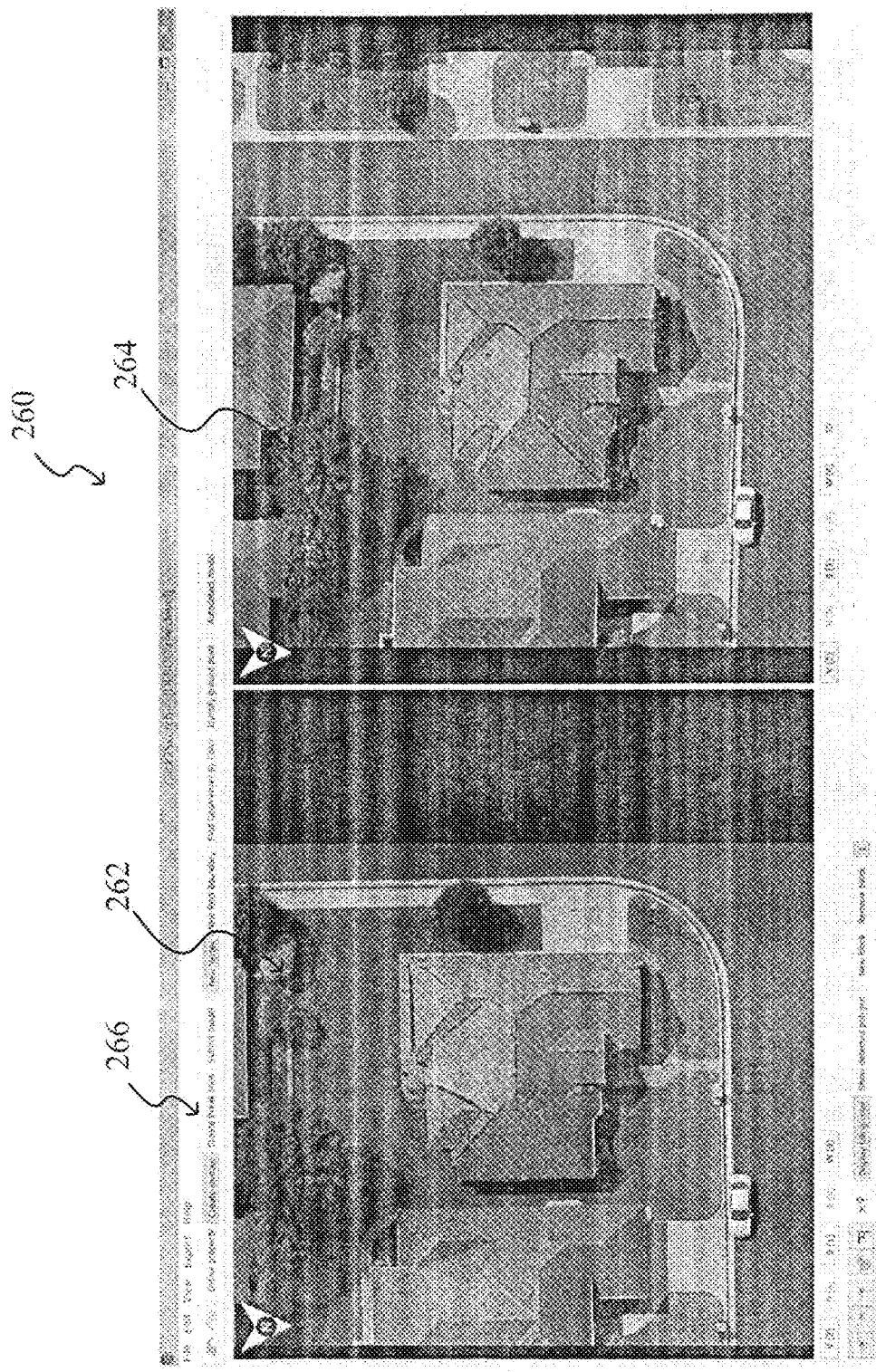
Figure 11:
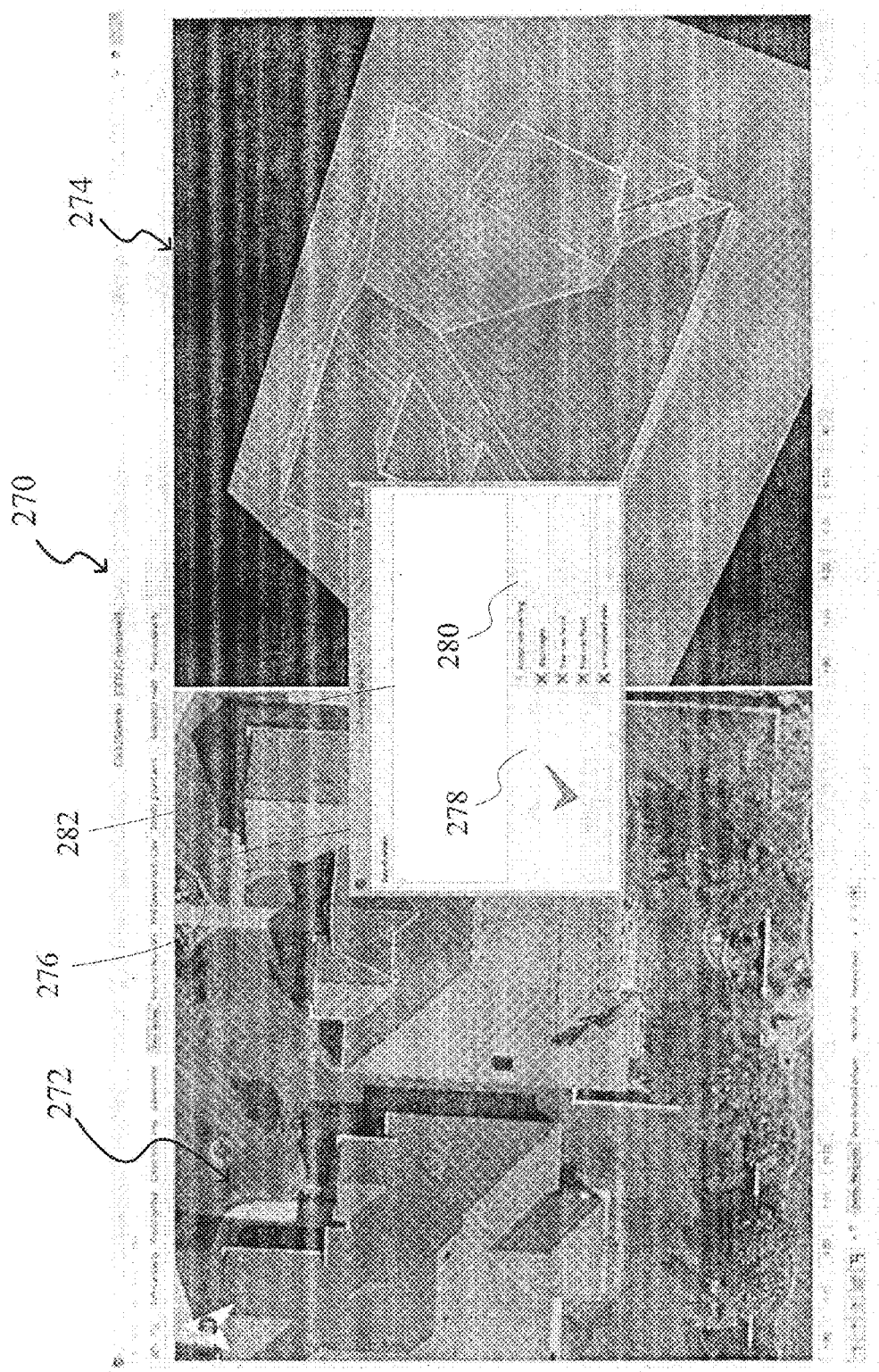

FIGS. 9-11 are showing various user interface screens generated by the system. More specifically, FIGS. 8-9 are screenshots 250, 260 showing a split pane interface allowing multiple views (e.g., left view 252, 262 and right view 254, 264) of the structure to help better evaluate and analyze details. The system provides an operator with basic tools including pan and zoom, the ability to display all images covering the structure, line and vertices adjustments (e.g., adding, editing and deleting vertices and lines), snapping appropriate angles between lines (90°, 45°, etc.), ensuring lines are parallel and/or horizontal, snapping to existing lines/vertices, etc. The interface could also provide upper toolbar 256, 266 and lower toolbar 258, 268, providing further functionality (e.g., define property, create contour, create break lines, submit model, new vertex, new rectangular boundary, find geometries by color, autodetect model, force coplanarity, display filling color, show detected polygon, new block, remove block, etc.). This allows the operator to view and edit the model frame with the model frame superimposed on one or more aerial different aerial images of the roof (e.g., orthographic, etc.).

FIG. 11 is another screenshot of a user interface of the system. The screenshot 270 shows the split pane interface, with an aerial view of a housing structure in the left pane 272, a three-dimensional model of the housing structure in the right pane 274, and a submission window 276 overlaying both. The submission window 276 includes a comment area 282 for a user to manually write a report, a submit button 278, and a list of possible issues or submission alternatives 280 to select (e.g., accept with warning, bad images, tree was found, pool was found, unrecognized area, etc.). The system could also present the operator with questions to record any useful feedback (e.g., for quality assurance).

Figure 12:
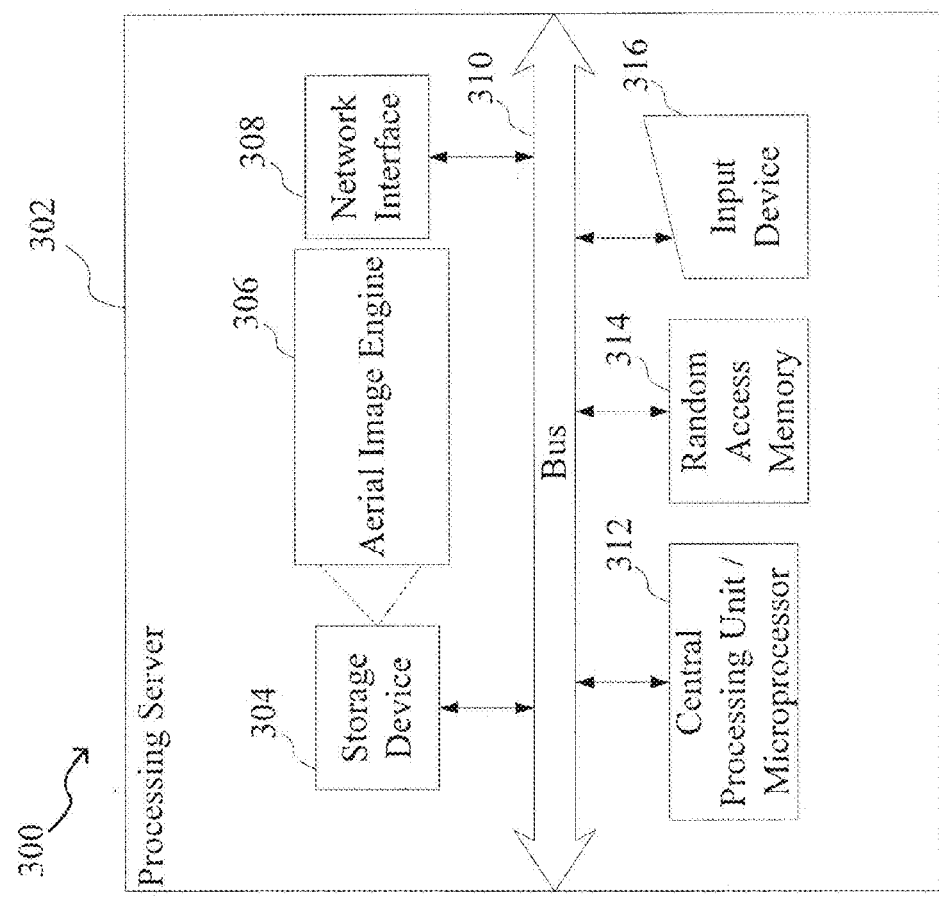
FIG. 12 is a diagram showing hardware and software components of the system.

FIG. 12 is a diagram showing hardware and software components of the system 300. The system 300 comprises a processing server 302 which could include a storage device 304, a network interface 308, a communications bus 310, a central processing unit (CPU) (microprocessor) 312, a random access memory (RAM) 314, and one or more input devices 316, such as a keyboard, mouse, etc. The server 302 could also include a display (e.g., liquid crystal display (LCD), cathode ray tube (CRT), etc.). The storage device 304 could comprise any suitable, computer-readable storage medium such as disk, non-volatile memory (e.g., read-only memory (ROM), eraseable programmable ROM (EPROM), electrically-eraseable programmable ROM (EEPROM), flash memory, field-programmable gate array (FPGA), etc.). The server 302 could be a networked computer system, a personal computer, a smart phone, tablet computer etc. It is noted that the server 302 need not be a networked server, and indeed, could be a stand-alone computer system.

The functionality provided by the present disclosure could be provided by an aerial image engine 306, which could be embodied as computer-readable program code stored on the storage device 304 and executed by the CPU 312 using any suitable, high or low level computing language, such as Python, Java, C, C++, C#, .NET, etc. The network interface 308 could include an Ethernet network interface device, a wireless network interface device, or any other suitable device which permits the server 302 to communicate via the network. The CPU 312 could include any suitable single- or multiple-core microprocessor of any suitable architecture that is capable of implementing and running the program 306 (e.g., Intel processor). The random access memory 314 could include any suitable, high-speed, random access memory typical of most modern computers, such as dynamic RAM (DRAM), etc.

Figure 13:
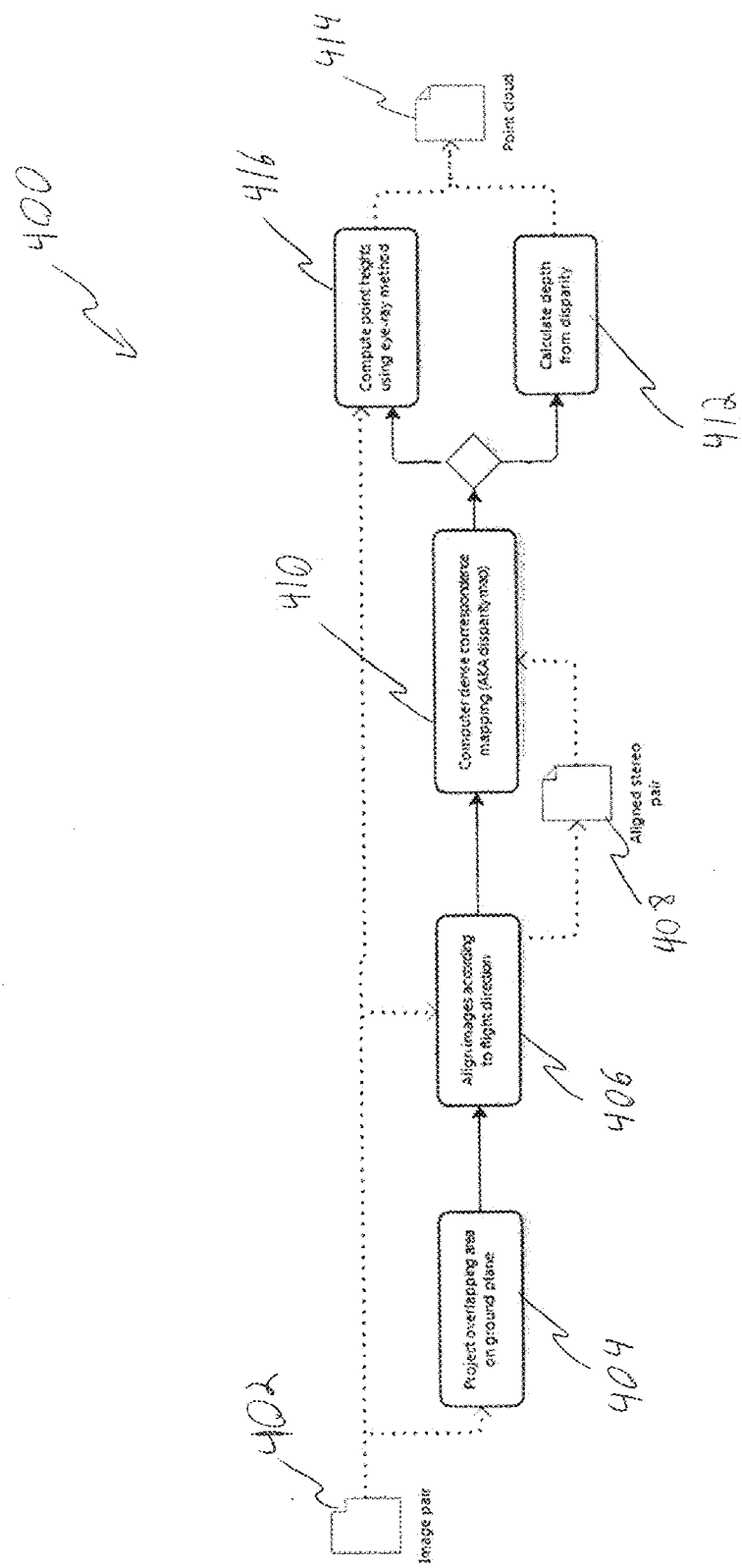
FIG. 13 is a diagram showing processing steps carried out by the aerial image engine of the present invention for generating a point cloud from a pair of aerial images.

FIG. 13 is a diagram showing processing steps 400 for generating a point cloud from a pair of aerial images, performed by an aerial image engine, and more specifically the object detection pre-processing engine. It is noted that point cloud data could be acquired during data capture and/or during image processing.

At step 402, a pair of aerial images (e.g., image pair) is selected/identified (automatically by the engine or manually by the user). The pair of aerial images could be electronically received from a computer system, electronically transmitted from a database, etc. The engine could utilize a number of constraints in selecting the pair of aerial images. For example, the engine could require the pair of aerial images to have the same basic orientation (e.g., both are vertical images, both are oblique west images, etc.), the engine could require that the images have a large overlap area, and/or the engine could require that there is a small difference in capture time between both images (e.g., to avoid the effect of illumination changes).

At step 404, the engine projects an overlapping area on ground plane data (using the pair of aerial images of step 402). More specifically, the engine calculates the overlapping area of the images, and projects the relevant area from both images onto a horizontal ground plane of an approximate height (e.g., where the height could be extracted from the image parameters). This corrects small scale and tilt differences between the two images.

At step 406, the engine aligns the images to the direction of flight of an aircraft or other flying vehicle from which aerial images are being taken (e.g., the line joining the observation points of both images) to produce an aligned stereoscopic pair of aerial images at step 408. This allows the engine to find horizontal correspondences between the two images. The engine rotates the images to align them to the flight direction to assimilate them to a canonical stereoscopic pair. The engine could also apply template matching to finely adjust the overlapping images.

At step 410, the engine computes dense correspondence mapping (e.g., disparity map, using the aligned stereoscopic pair of images of step 408). More specifically, the engine applies a multi-scale disparity map module to the stereoscopic pair of images. This provides a measurement of the discrepancy distance between corresponding features on both images. The engine assigns a disparity value to each pixel on at least one of the stereoscopic images (e.g., the left image).

Using a depth from disparity method, the engine calculates depth from disparity at step 412, which then generates a point cloud at step 414 (and electronically transmits point cloud data to another computer system). More specifically, the engine calculates a height map by applying an algorithm to compute depth (e.g., distance from an observation point) as a linear function of the disparity value at each pixel (e.g., the focal distance of the camera and the distance between observation points). To generate the point cloud, the engine transforms coordinates of the height map from the aligned stereoscopic pair back to the original image pair.

Alternatively (or additionally), the engine computes point heights using an eye-ray method at step 416 (based on the pair of images of step 402), and the produces the point cloud 414. More specifically, the engine transforms disparity values of the disparity map from the aligned stereoscopic pair back to the original image pair. Then the engine applies the eye-ray method, which triangulates each point using the vision rays from both observation points. This provides a more precise height map than the depth from disparity method.

Figure 14:
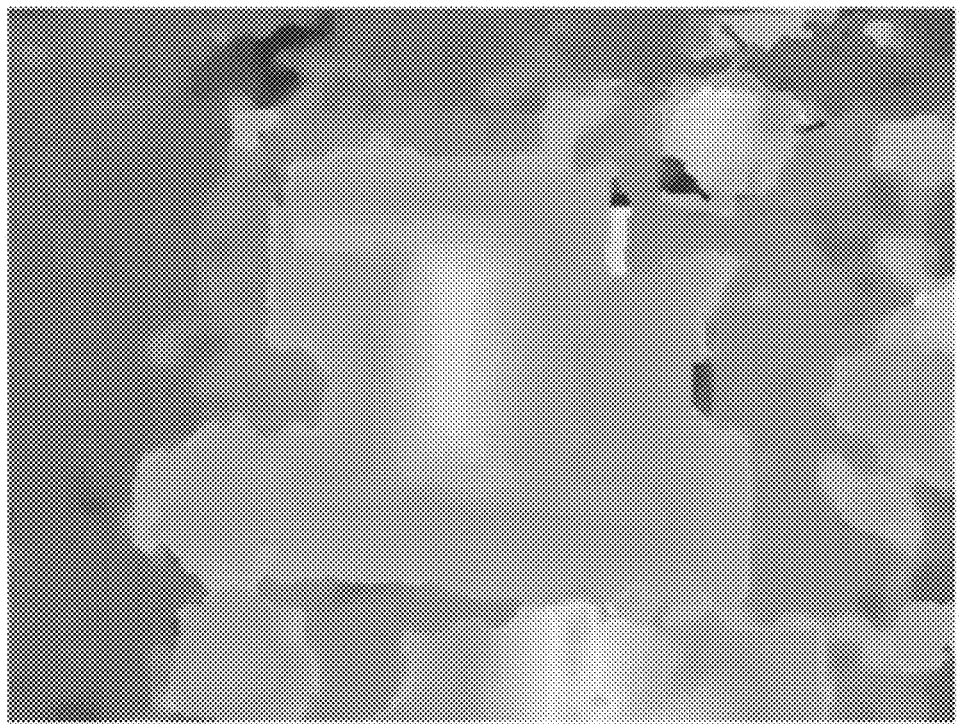
FIG. 14 is a disparity map generated by the engine using a depth from disparity method.
Figure 15:
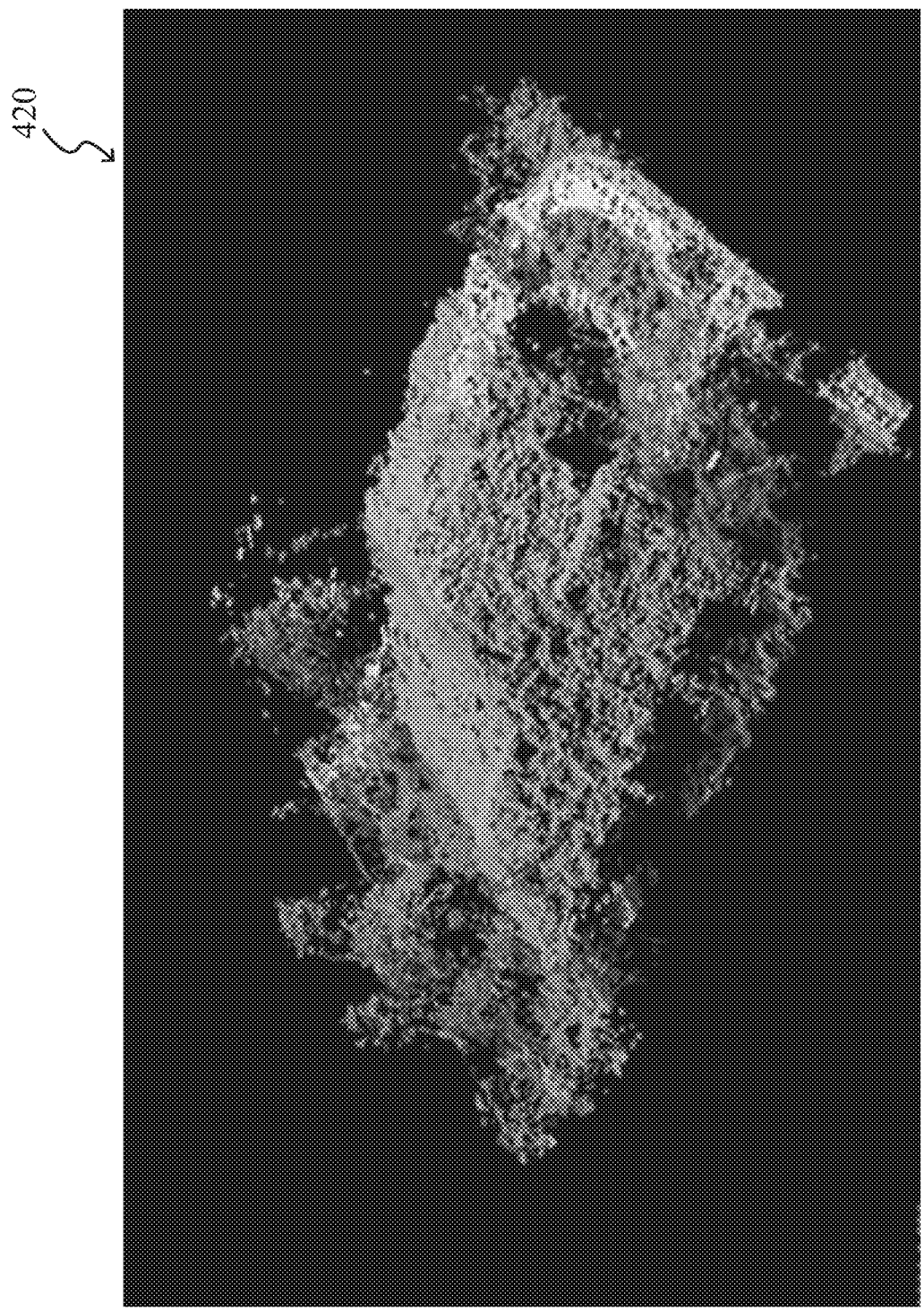
FIG. 15 is a point cloud generated by the engine using the depth from disparity method.

FIGS. 14-15 are views of a disparity map and point cloud generated from the depth from disparity method of FIG. 13. More specifically, FIG. 14 is a disparity map 418 generated by the engine using the depth from disparity method. FIG. 15 is a point cloud 420 generated by the engine using the depth from disparity method.

Figure 16:
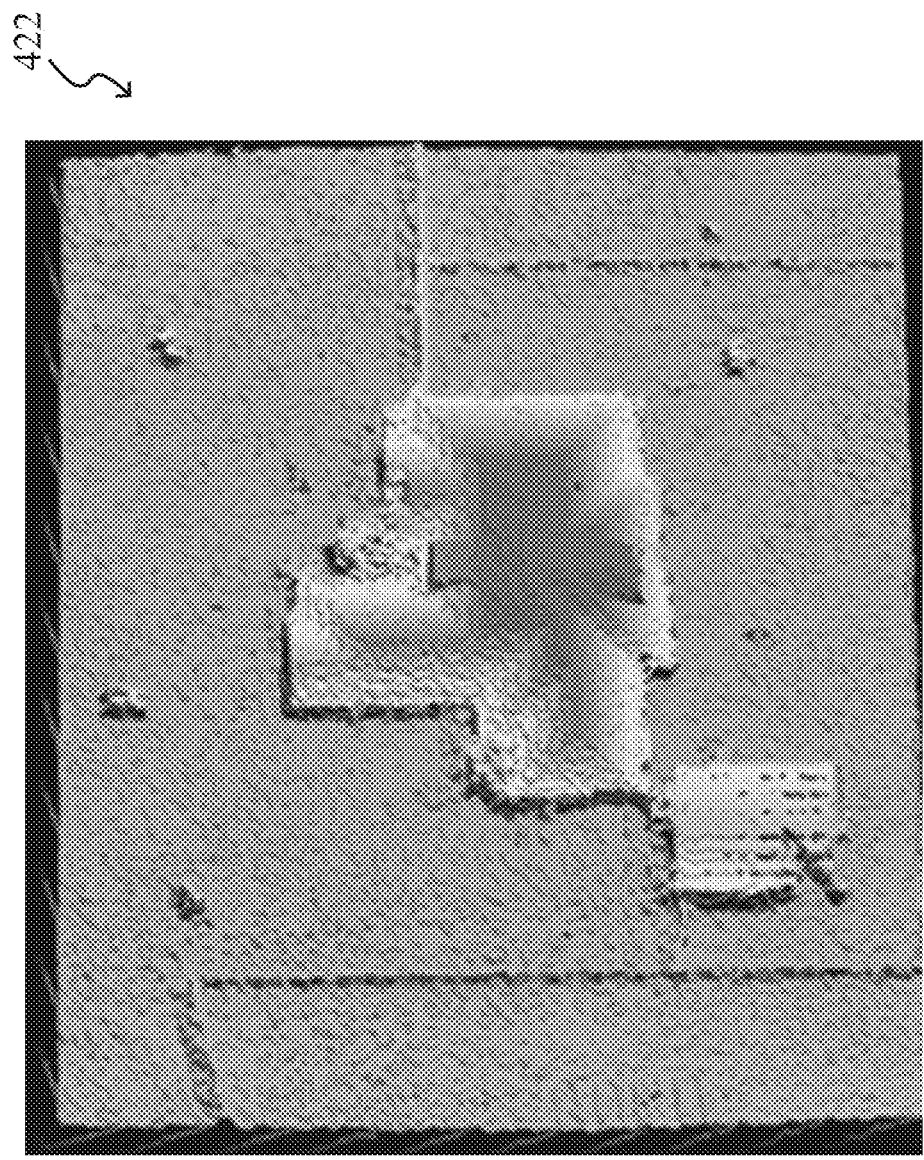
FIG. 16 is a disparity map generated by the engine using the eye-ray method.
Figure 17:
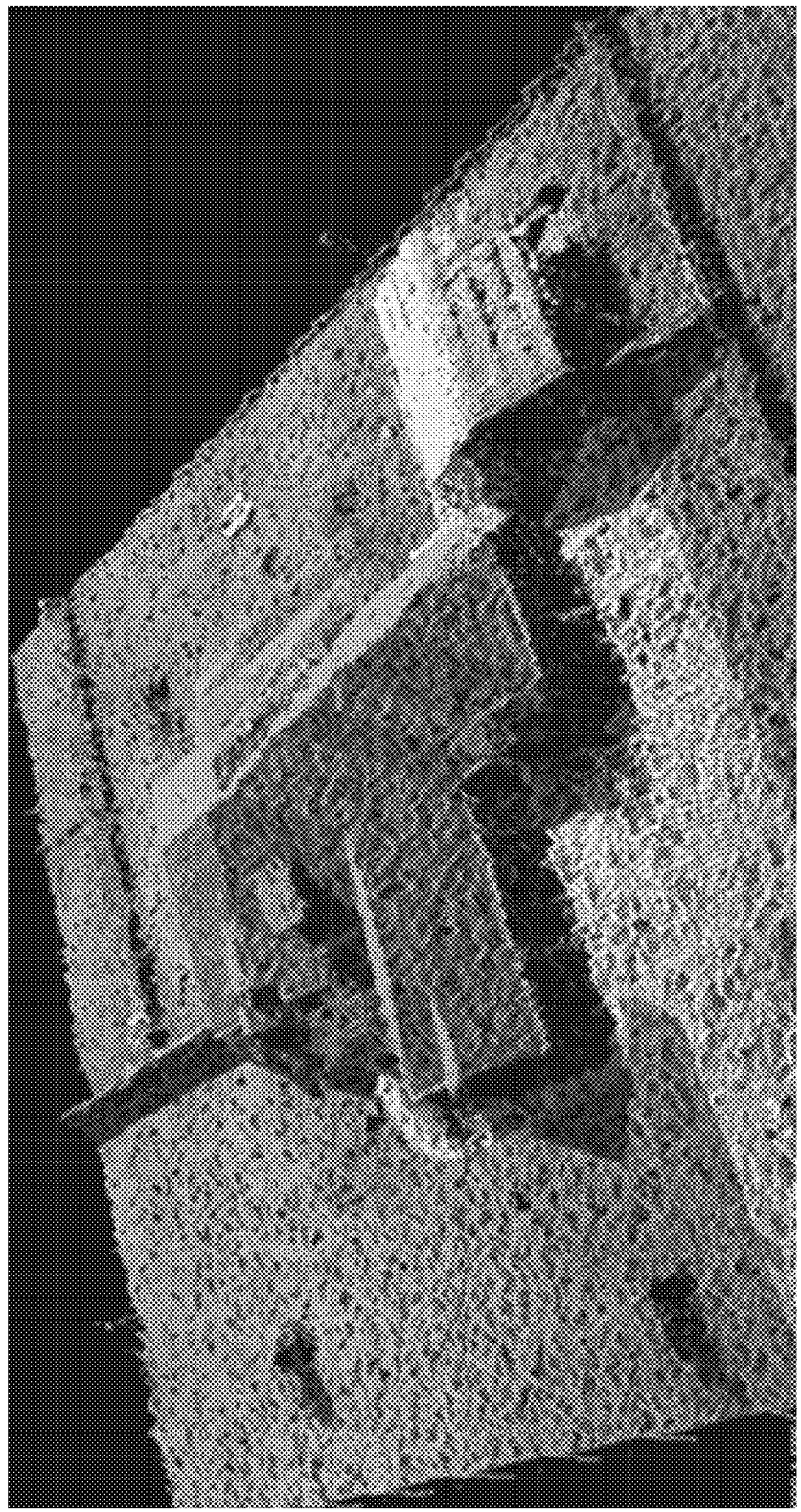
FIG. 17 is a point cloud generated by the engine using the eye-ray method.

FIGS. 16-17 are views of a disparity map and point cloud generated from the depth from disparity method of FIG. 13. More specifically, FIG. 16 is a disparity map 422 generated by the engine using the eye-ray method. FIG. 17 is a point cloud 424 generated by the engine using the eye-ray method.

Figure 18:
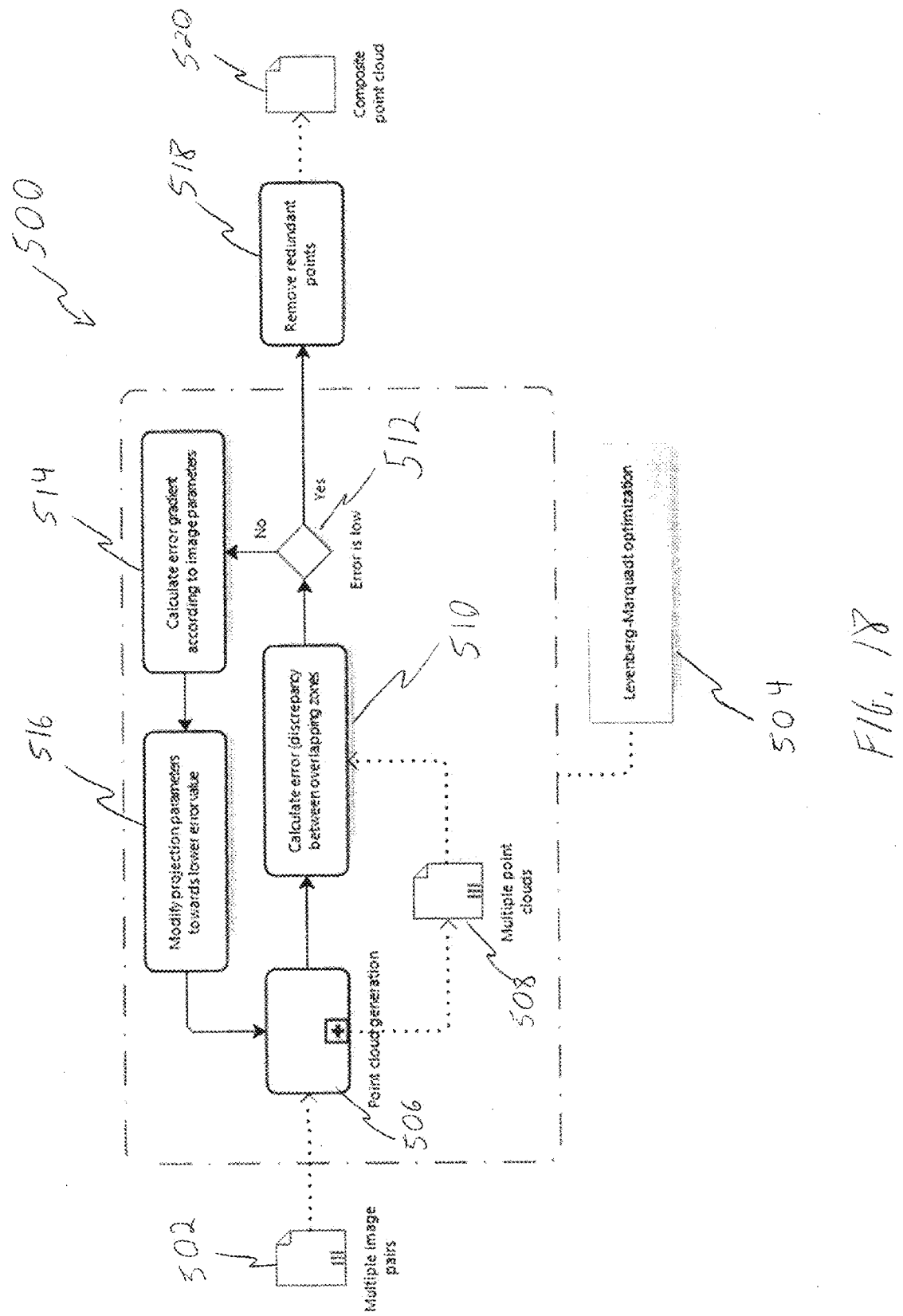
FIG. 18 is a diagram showing processing steps for generating a composite point cloud from multiple image pairs.

FIG. 18 is a diagram showing processing steps 500 for generating a composite point cloud from multiple image pairs, such as those used in FIGS. 13-17. At step 502, multiple pairs of aerial images are selected/identified (automatically by the engine or manually by the user). The multiple pairs of aerial images could be electronically received from a computer system, electronically transmitted from a database, etc. The engine could utilize a number of constraints in selecting the pairs of aerial images (as similarly described above). For example, the engine could require that each pair of aerial images have the same basic orientation (e.g., both are vertical images, both are oblique west images, etc.), the engine could require that the images have a large overlap area, and/or the engine could require that there is a small difference in capture time between both images (e.g., to avoid the effect of illumination changes).

Once multiple image pairs have been selected, the engine applies a Levenberg-Marquadt optimization module 504 to the multiple image pairs. More specifically, at step 506, the module 504 generates point clouds for each image pair (using the process described in FIG. 13). There are overlapping zones between different point clouds, although the overlap may not be a perfect fit. In step 508, multiple point clouds are generated.

In step 510, the engine calculates the error resulting from the multiple point clouds (e.g., discrepancy between overlapping zones). More specifically, the engine calculates 3D features for each point cloud. The engine evaluates the discrepancy between point clouds as an error metric that uses distances between corresponding 3D features. The engine accumulates the error metric to include overlaps between all point clouds.

At step 512 the engine determines whether the error is low (e.g., a pre-defined threshold). If no, the process proceeds to step 514, and the engine calculates an error gradient according to image parameters. More specifically, the engine adjusts the camera parameters to each image covering a large area and containing many different buildings. The discrepancies between point clouds are expected to be produced by minor camera parameter errors (e.g., as the camera parameters may not be the best for each single building on the image). The engine checks the change of error gradient against minor changes in camera parameters (e.g., using a Jacobain matrix and determinant).

Then, in step 516, the engine modifies projection parameters toward a lower error value. More specifically, the engine makes small changes to the camera parameters so that the error is reduced in a new computation of the point clouds. The process then reverts back to step 506, and new point clouds are generated. The process is repeated until the generated point clouds are calculated by the engine to have a low error. In this way, this process is an iterative gradient-descent optimization.

If, in step 512, the engine makes a positive determination that the error is low (thereby concluding the Levenberg-Marquadt optimization), then the process proceeds to step 518 and the engine removes redundant points. More specifically, the engine removes redundant points by using the ones with higher confidence according to the orientation of each point cloud region. Then the engine generates a composite point cloud at step 520. Redundant points are removed because a composite point cloud (including all points from each individual point cloud) contains a large amount of information, and discrepancies in overlapping areas (although low) may be seen as noise by other engines (e.g., modules, algorithms, etc.), such as by a plane detection module.

Figure 19:
FIG. 19 is a nadir view of a point cloud based on a nadir pair of images.
Figure 20:
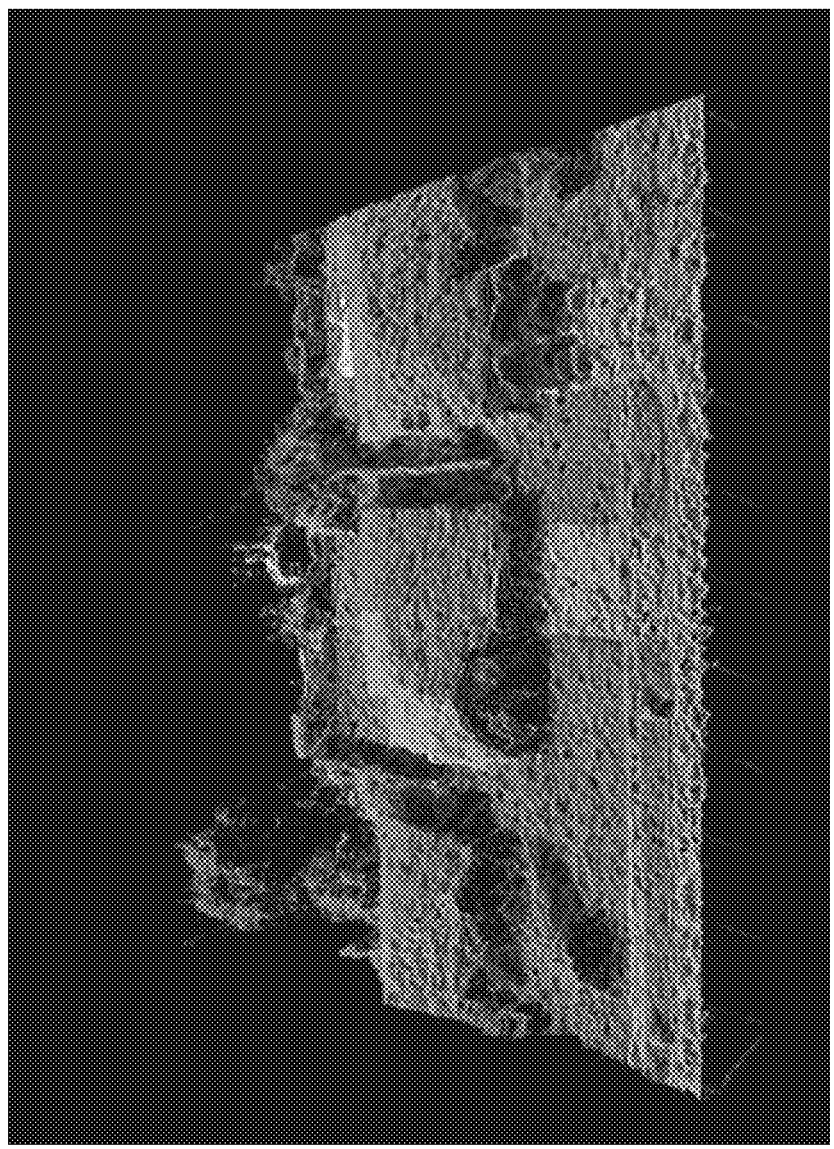
FIG. 20 is an oblique view of a point cloud based on a nadir pair of images.
Figure 21:
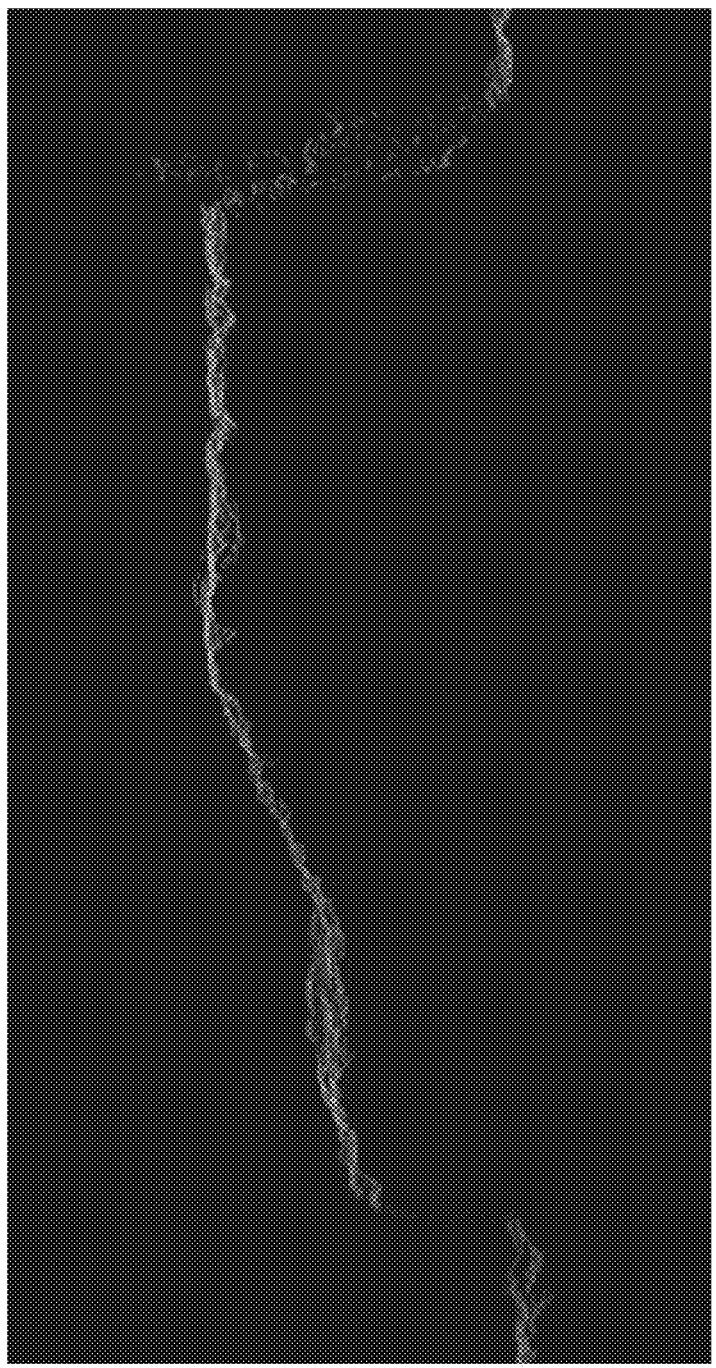
FIG. 21 is a slice of the point cloud that crosses the front windows of the building shown based on a nadir pair of images.

FIGS. 19-21 are views related to a point cloud based on a nadir pair of images. More specifically, FIG. 19 is a nadir (vertical) view 522 of a point cloud based on a nadir pair of images. FIG. 20 is an oblique view 524 of a point cloud based on a nadir pair of images. FIG. 21 is a slice 526 of the point cloud that cross the front windows of the building shown based on a nadir pair of images.

Figure 22:
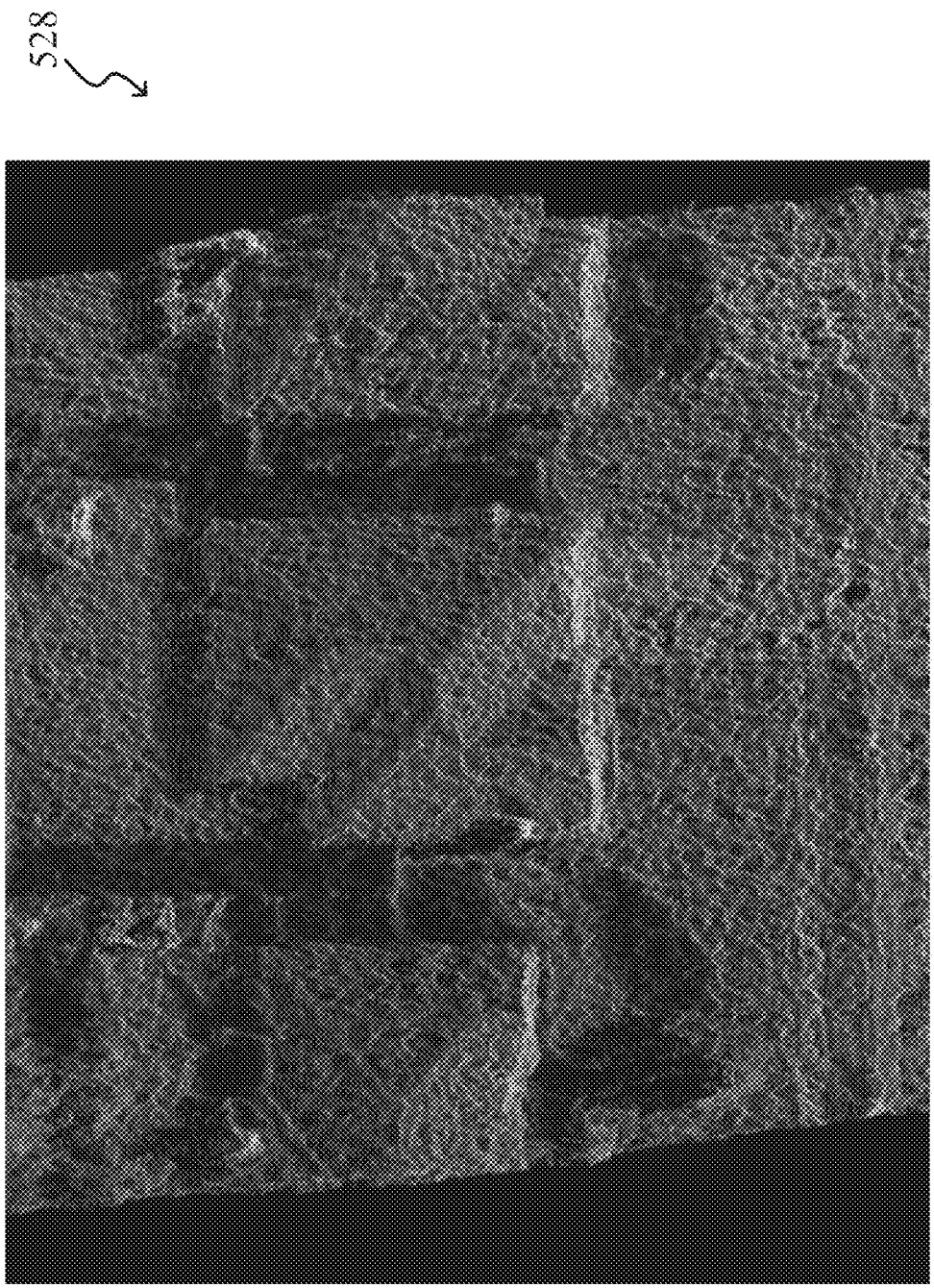
FIG. 22 is a nadir view of a point cloud based on an oblique pair of images.
Figure 23:
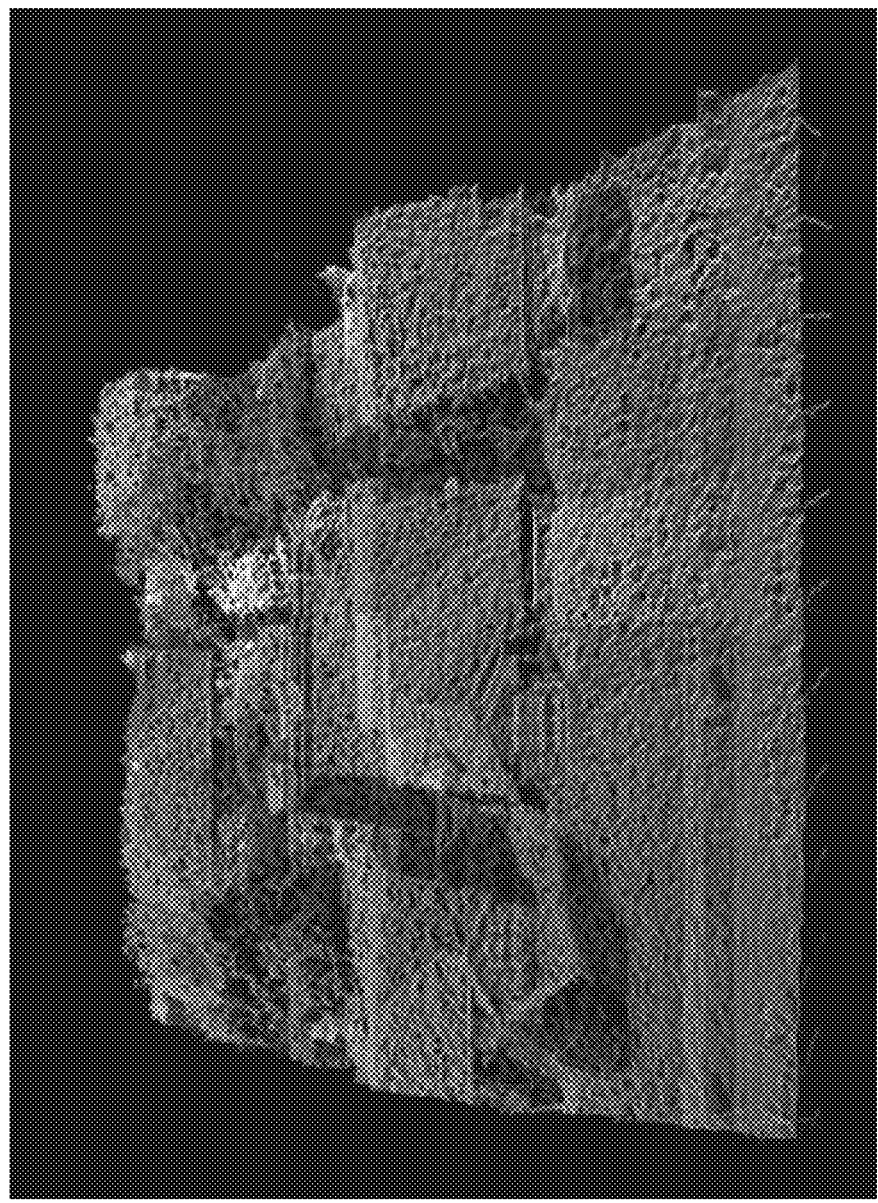
FIG. 23 is an oblique view of a point cloud based on an oblique pair of images.
Figure 24:
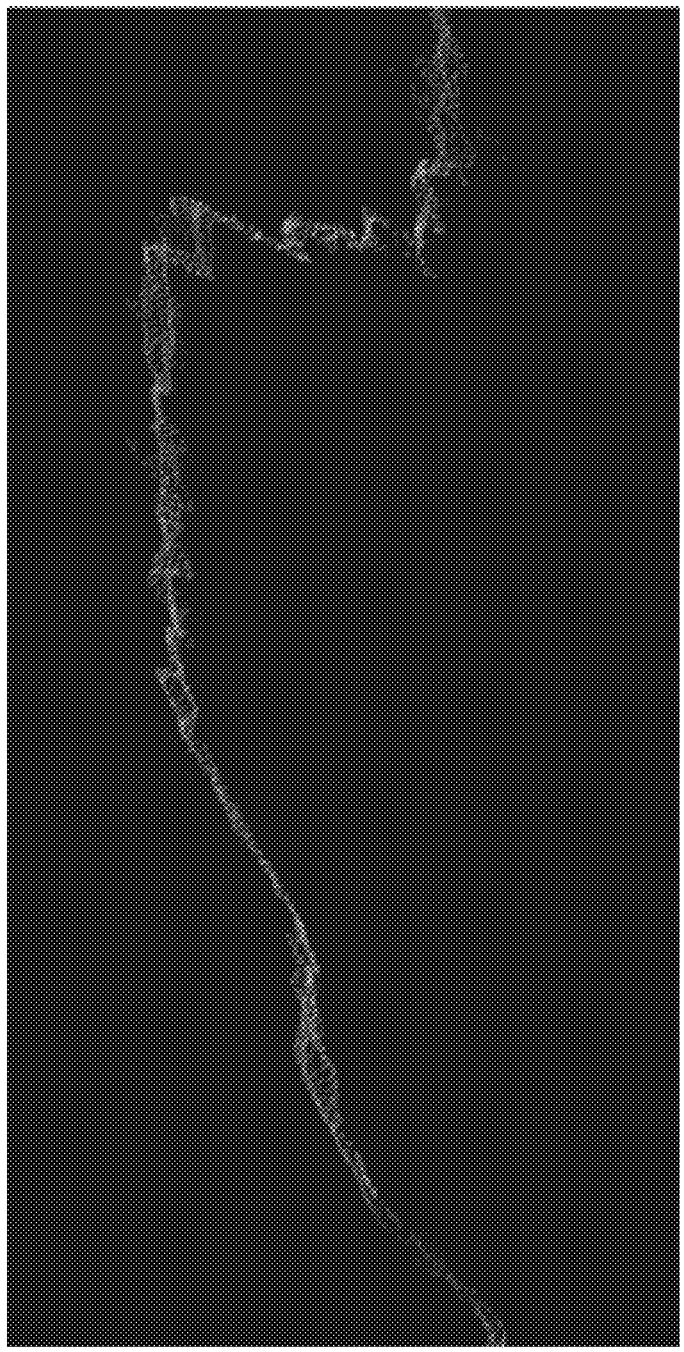
FIG. 24 is a slice of the point cloud that crosses the front windows of the building shown based on an oblique pair of images.

FIGS. 22-24 are views related to a point cloud based on an oblique pair of images. More specifically, FIG. 22 is a nadir (vertical) view 528 of a point cloud based on an oblique pair of images. FIG. 23 is an oblique view 530 of a point cloud based on an oblique pair of images. FIG. 24 is a slice 532 of the point cloud that cross the front windows of the building shown based on an oblique pair of images.

Figure 25:
FIG. 25 is a nadir view of a point cloud based on a combination of nadir and oblique pairs of images.
Figure 26:
FIG. 26 is an oblique view of a point cloud based on a combination of nadir and oblique pairs of images.
Figure 27:
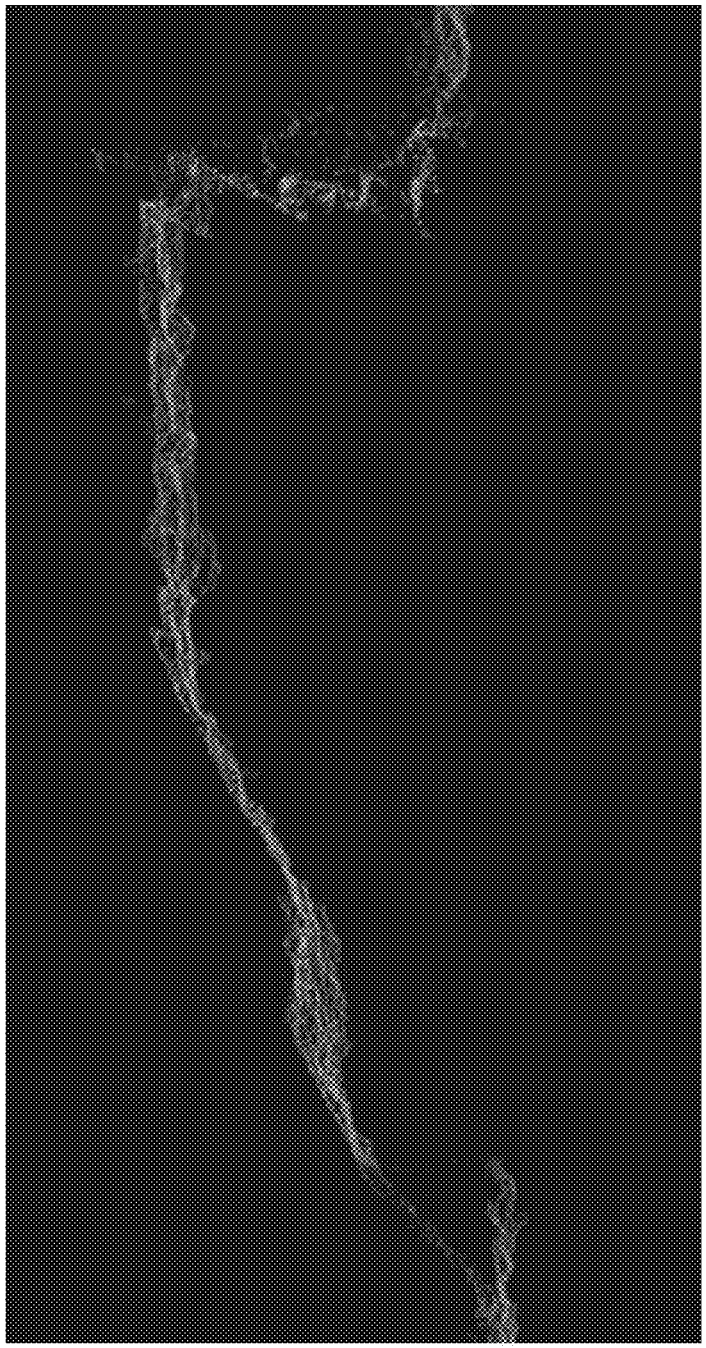
FIG. 27 is a slice of the point cloud that crosses the front windows the building shown based on a combination of nadir and oblique pairs of images.

FIGS. 25-27 are views related to a point cloud based on a combination of nadir and oblique pairs of images. More specifically, FIG. 25 is a nadir (vertical) view 534 of a point cloud based on a combination of nadir and oblique pairs of images. FIG. 26 is an oblique view 536 of a point cloud based on a combination of nadir and oblique pairs of images. FIG. 27 is a slice 538 of the point cloud that cross the front windows the building shown based on a combination of nadir and oblique pairs of images.

Figure 28:
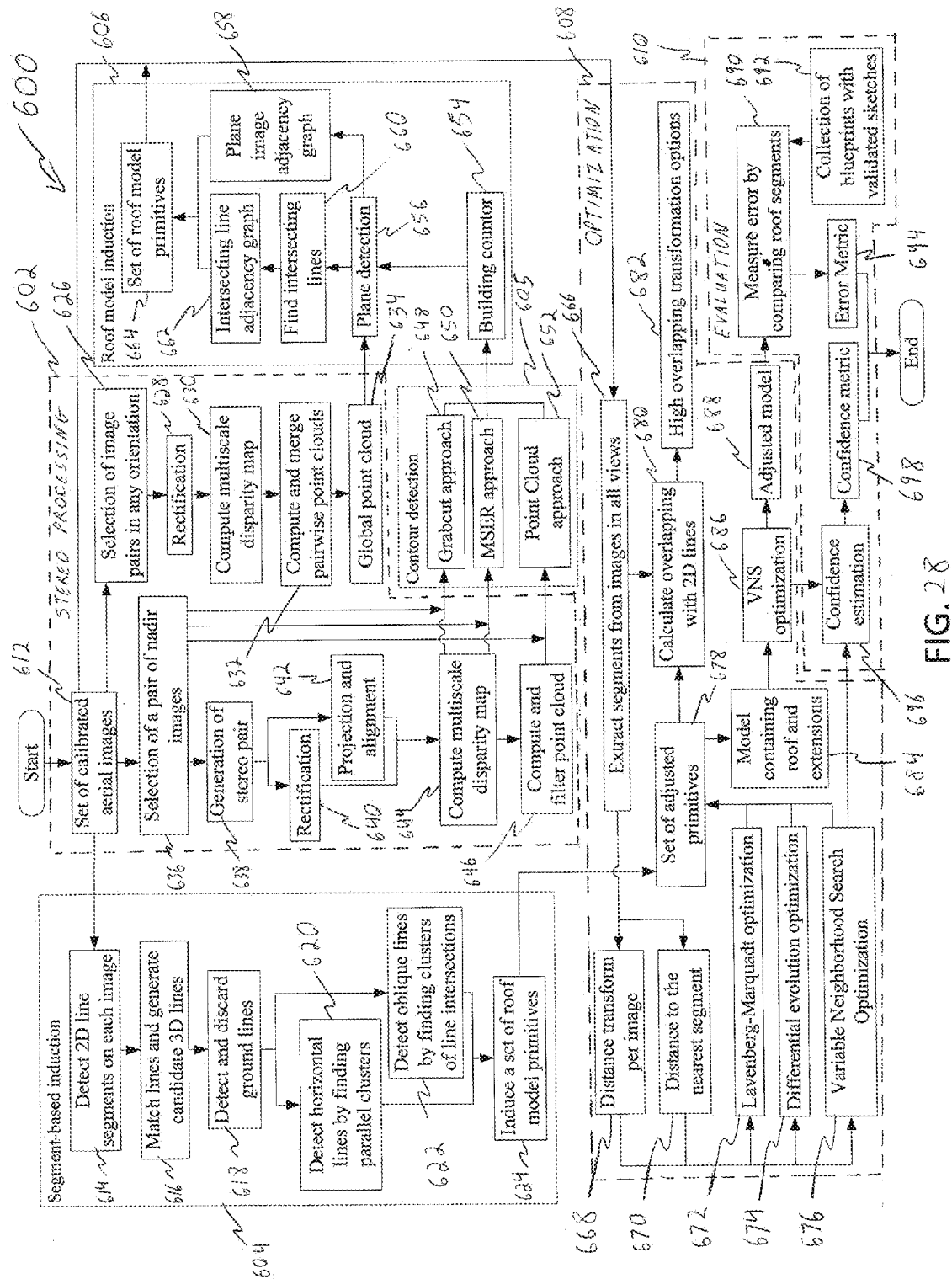
FIG. 28 is a diagram illustrating modules and associated processing steps for automated building recognition carried out by the aerial image engine.

FIG. 28 is a diagram of modules and associated processing steps for automated building recognition (and/or recognition of any other object) carried out by an aerial image engine 600, and more specifically the object detection pre-processing engine. The aerial image engine 600 could include one or more modules, such as a stereo processing module 602, a segment-based induction module 604, a contour detection module 605, a roof model induction model 606, an optimization module 608, and an evaluation module 610.

In step 612, the stereo processing module 602 automatically selects/identifies/receives (or a user manually selects/ identifies) a set of calibrated aerial images (e.g., as input). The calibrated aerial images could be received electronically from another computer system, a database, etc. In step 614, the segment-based induction module 604 uses the set of calibrated aerial images to detect 2D line segments on each image. The segment-based induction module 604 matches lines and generates candidate 3D lines at step 616, and detects and discards ground lines at step 618. Then, the segment-based induction module 604 detects horizontal lines by finding parallel clusters at step 620, and could concurrently, detect oblique lines by finding clusters of line intersections at step 622. In step 624, the segment-based induction module 604 induces a set of roof model primitives, which are subsequently used at step 678 by the optimization module 608, discussed in more detail below.

Returning to step 612, once the set of calibrated aerial images are selected/identified, the process (concurrently) proceeds to step 626, where the stereo processing module 602 selects image pairs in any orientation, and then the image pairs are rectified in step 628. The stereo processing module 602 computes a multiscale disparity map at step 630, then computes and merges pairwise point clouds at step 632, and then generates a global point cloud at step 634. The global point cloud generated is used at step 656 by the roof model induction module 606, discussed in more detail below.

Returning to step 612, once the set of calibrated aerial images are selected/identified, the process (concurrently) proceeds such that the stereo processing module 602 selects a pair of nadir images in step 636, and then generates a stereo pair of images in step 638. The stereo processing module 602 rectifies the stereo pair of images at step 640, and then (concurrently) projects and aligns the stereo images at step 642. The stereo processing module 602 then computes a multiscale disparity map at step 644, and computes and filters a point cloud at step 646.

The process then proceeds to the contour detection module 605. The contour detection module 605 includes one or more algorithms to detect contours. More specifically, the contour detection module 605 could include a grabcut approach algorithm 648, an MSER (maximally stable extremal regions) approach algorithm 650, and/or a point cloud approach algorithm 652. The grabcut approach 648 and the MSER approach 650 each receive the selected pair of nadir images of step 636 and the computed multiscale disparity map of step 644 as inputs. The point cloud approach 652 receives the selected pair of nadir images of step 636 and the computed and filtered point cloud of step 646 as inputs. Each of the approaches then generates an output to be used by the roof model induction module 606.

Processing proceeds to the roof model induction module 606 which builds contours at step 654 (based on the output of the contour detection module 605), and detects planes at step 656 (based on the global point cloud generated at step 634). Then the roof model induction module 606 finds intersecting lines at step 660 and generates an intersecting line adjacency graph at step 662. Concurrently with steps 660, 662, the roof model induction module 606 generates a plane image adjacency graph at step 658. The roof model induction module 606 then generates a set of roof model primitives at step 664.

The process then proceeds to the optimization module 608, which extracts segments from images in all views at step 666 (based on the set of calibrated aerial images of step 612 and based on the set of roof model primitives of step 664). The optimization module 608 then applies a distance transform per image at step 668 and (concurrently) applies a distance to the nearest segment at step 670. The results/ outputs of steps 668 and 6670 are then used as inputs in one or more optimization algorithms of the optimization module 608. More specifically, the optimization algorithms could include a Lavenberg-Marquadt optimization algorithm 672, a differential evolution optimization algorithm 674, and/or a variable neighborhood search optimization algorithm 676. Then at step 678 a set of adjusted primitives is generated by the optimization module 608 (based on the set of roof model primitives induced at step 624 and based on the output of the one or more optimization algorithms 672, 674, 676).

The optimization module 608 then calculates overlapping with 2D lines at 680 (using the set of adjusted primitives 678), and then applies one or more high overlapping transformation options at step 682. Additionally, the optimization module 608 generates a model containing a roof and extensions at step 684. The optimization module 608 applies VNS (variable neighborhood search) optimization at step 686 and generates an adjusted model at step 688. The adjusted model and VNS optimization are then outputted to the evaluation module 610.

The process then proceeds to the evaluation module 610, which measures error by comparing roof segments at step 690 (based on the adjusted model of step 688, and based on a collection of blueprints with validated sketches of step 692). The evaluation module 610 then generates an error metric at step 694. Additionally, the evaluation module 610 generates confidence estimation at step 696 (based on the VNS optimization of steps 676 and 686). The evaluation module 610 then generates a confidence metric at step 698.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

The invention claimed is:

1. A system for aerial image detection and classification, comprising:
   an aerial image database storing one or more aerial images electronically received from one or more image providers; and
   a computer system in communication with the aerial image database, the computer system including an object detection pre-processing engine in electronic communication with the aerial image database, the object detection pre-processing engine detecting and classifying objects using:
   a disparity mapping generation module for automatically processing the one or more aerial images to generate a disparity map providing elevation information;
   a segmentation module for automatically applying a pre-defined elevation threshold to the disparity map, the pre-defined elevation threshold adjustable by a user; and a classification module for automatically detecting and classifying objects in the one or more stereoscopic pairs of aerial images by applying one or more automated detectors based on classification parameters and the pre-defined elevation threshold;

wherein, if the height of an object is above the pre-defined elevation threshold, then the classification module automatically classifies the object as a building, and if the height of the object is below the pre-defined elevation threshold, then the classification module applies the one or more automated detectors to the object in order to classify the object.

2. The system of claim 1, wherein the classification parameters include at least one of aspect parameters, disparity parameters, color parameters, or texture parameters.

3. The system of claim 1, further comprising a mass production engine in electronic communication with the object detection pre-processing engine, the mass production engine automatically producing drawings, sketches, and models using the elevation information generated by the object detection pre-processing engine.

4. The system of claim 1, further comprising a project and task management system in electronic communication with the object detection pre-processing engine, the project and task management system guiding a user in creating and publishing one or more projects using the elevation information generated by the object detection pre-processing engine.

5. The system of claim 1, wherein the one or more automated detects includes at least one of a region growing algorithm or a split-and-merge segmentation algorithm.

6. The system of claim 1, wherein the disparity mapping generation module of the object detection pre-processing engine generates a point cloud.

7. The system of claim 6, wherein the object detection pre-processing engine generates the point cloud by computing point heights using an eye-ray method.

8. A method for aerial image detection and classification, comprising:
electronically receiving at a computer system including an object detection pre-processing engine one or more aerial images from an aerial image database, the one or more aerial images electronically received at the aerial image database from one or more image providers;
automatically processing, by the object detection pre-processing engine, the one or more aerial images to generate a disparity map providing elevation information;
automatically applying, by the object detection pre-processing engine, a pre-defined elevation threshold to the disparity map, the pre-defined elevation threshold adjustable by a user; and
automatically detecting and classifying, by the object detection pre-processing engine, objects in the one or more stereoscopic pairs of aerial images by applying one or more automated detectors based on classification parameters and the pre-defined elevation threshold
wherein the step of automatically detecting and classifying the object comprises automatically classifying an object as a building if a height of the object is above the pre-defined elevation threshold, and applying the one or more automated detectors to classify the object if the height of the object is below the pre-defined elevation threshold.

9. The method of claim 8, wherein the classification parameters include at least one of aspect parameters, disparity parameters, color parameters, or texture parameters.

10. The method of claim 8, further comprising automatically producing, by a mass production engine, drawings, sketches, and models by using the elevation information generated by the object detection pre-processing engine, the mass production engine in electronic communication with the object detection pre-processing engine.

11. The method of claim 8, further comprising guiding, by a project and task management system, a user in creating and publishing one or more projects using the elevation information generated by the object detection pre-processing engine, the project and task management system in electronic communication with the object detection pre-processing engine.

12. The method of claim 8, wherein the engine executes at least one of a region growing algorithm or a split-and-merge segmentation algorithm.

13. The method of claim 8, further comprising generating a point cloud by the object detection pre-processing engine.

14. The method of claim 13, wherein the object detection pre-processing engine generates the point cloud by computing point heights using an eye-ray method.

15. A non-transitory computer-readable medium having computer-readable instructions stored thereon which, when executed by a computer system having an object detection pre-processing engine, cause the computer system to perform the steps of:
electronically receiving one or more aerial images from an aerial image database, the one or more aerial images electronically received at the aerial image database from one or more image providers;
automatically processing, by the object detection pre-processing engine, the one or more aerial images to generate a disparity map providing elevation information;
automatically applying, by the object detection pre-processing engine, a pre-defined elevation threshold to the disparity map, the pre-defined elevation threshold adjustable by a user; and
automatically detecting and classifying, by the object detection pre-processing engine, objects in the one or more stereoscopic pairs of aerial images by applying one or more automated detectors based on classification parameters and the pre-defined elevation threshold;
wherein the step of automatically detecting and classifying the object comprises automatically classifying an object as a building if a height of the object is above the pre-defined elevation threshold, and applying the one or more automated detectors to classify the object if the height of the object is below the pre-defined elevation threshold.

16. The non-transitory computer-readable medium of claim 15, wherein the classification parameters include at least one of aspect parameters, disparity parameters, color parameters, or texture parameters.

17. The non-transitory computer-readable medium of claim 15, further comprising automatically producing, by a mass production engine, drawings, sketches, and models by using the elevation information generated by the object detection pre-processing engine, the mass production engine in electronic communication with the object detection pre-processing engine.

18. The non-transitory computer-readable medium of claim 15, further comprising guiding, by a project and task management system, a user in creating and publishing one or more projects using the elevation information generated by the object detection pre-processing engine, the project and task management system in electronic communication with the object detection pre-processing engine.

19. The non-transitory computer-readable medium of claim 15, wherein the engine executes at least one of a region growing algorithm or a split-and-merge segmentation algorithm.

20. The non-transitory computer-readable medium of claim 15, further comprising generating a point cloud by the object detection pre-processing engine.

21. The non-transitory computer-readable medium of claim 20, wherein the object detection pre-processing engine generates the point cloud by computing point heights using an eye-ray method.

* * * * *

UNITED STATES PATENT AND TRADEMARK OFFICE
CERTIFICATE OF CORRECTION

PATENT NO.       : 9,679,227 B2                                    Page 1 of 1
APPLICATION NO.  : 14/450861
DATED            : June 13, 2017
INVENTOR(S)      : Jeffrey Taylor et al.

It is certified that error appears in the above-identified patent and that said Letters Patent is hereby corrected as shown below:

On the Title Page

On Page 3, under the References Cited Foreign Patent Documents column, the first reference down, the document number "DE 1419359" should be deleted and replaced with "DE 4419359"

In the Specification

In Column 3, Line 38, the word "with" should be deleted and replaced with the word "would"

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*